March 28, 1961 P. J. WEAVER 2,976,688
MACHINE TOOL CONTROL
Filed May 18, 1959 4 Sheets-Sheet 3
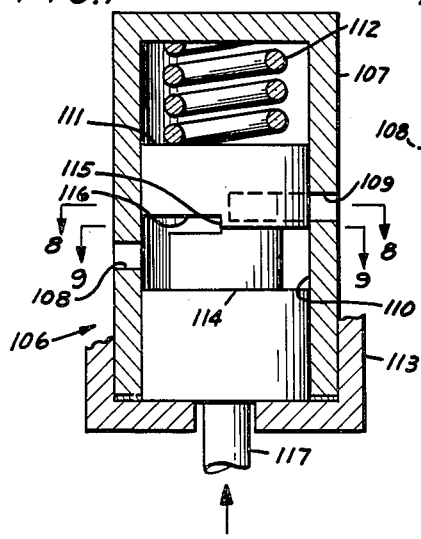
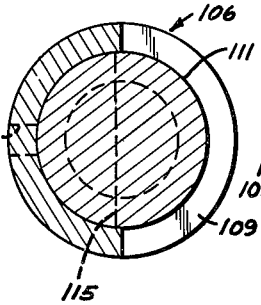
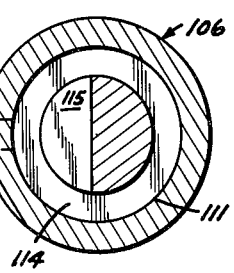
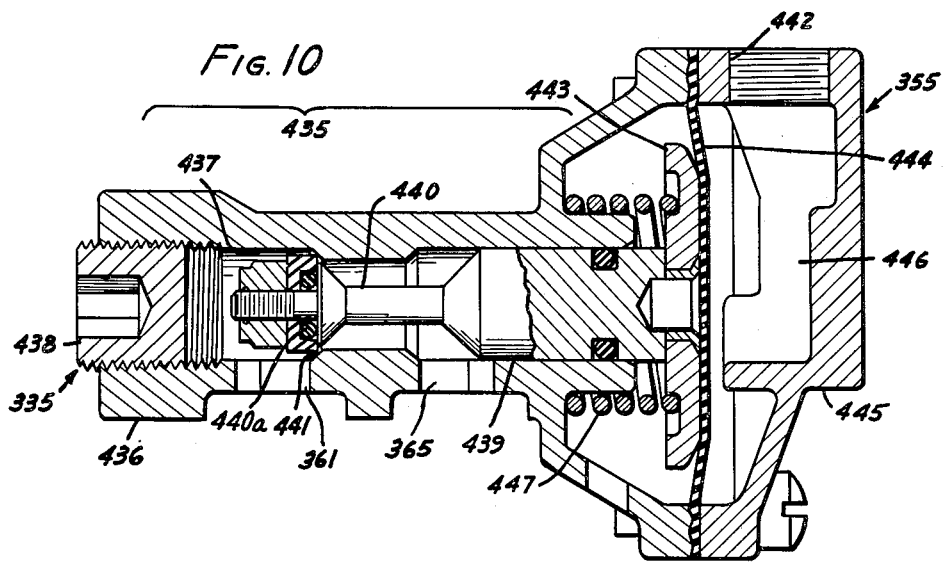
INVENTOR.
PAUL J. WEAVER
BY
ATTORNEYS March 28, 1961 P. J. WEAVER 2,976,688
MACHINE TOOL CONTROL
Filed May 18, 1959 4 Sheets-Sheet 4
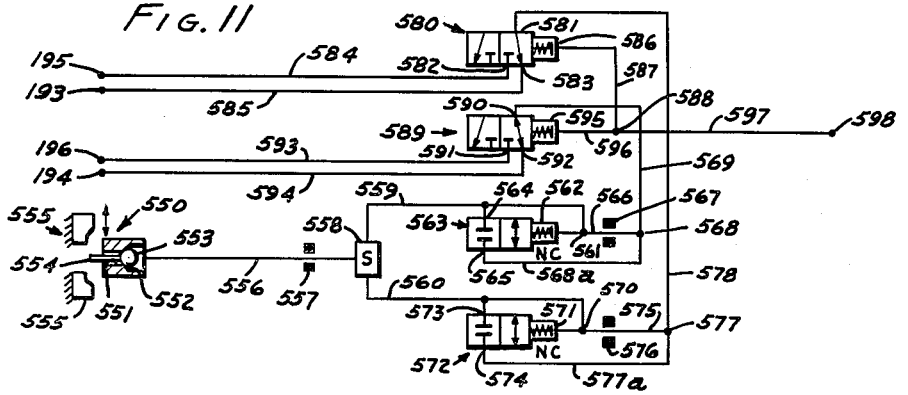
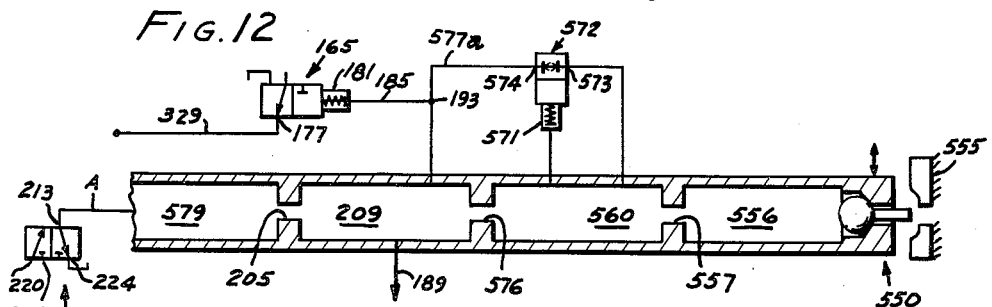
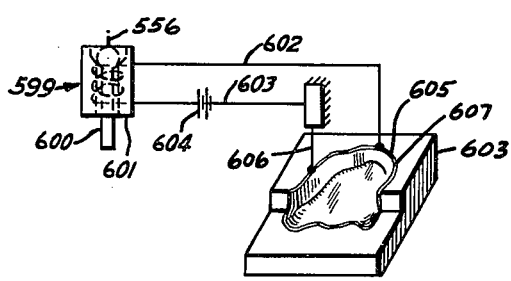
INVENTOR.
PAUL J. WEAVER
BY
Angus & Mow
ATTORNEYS.

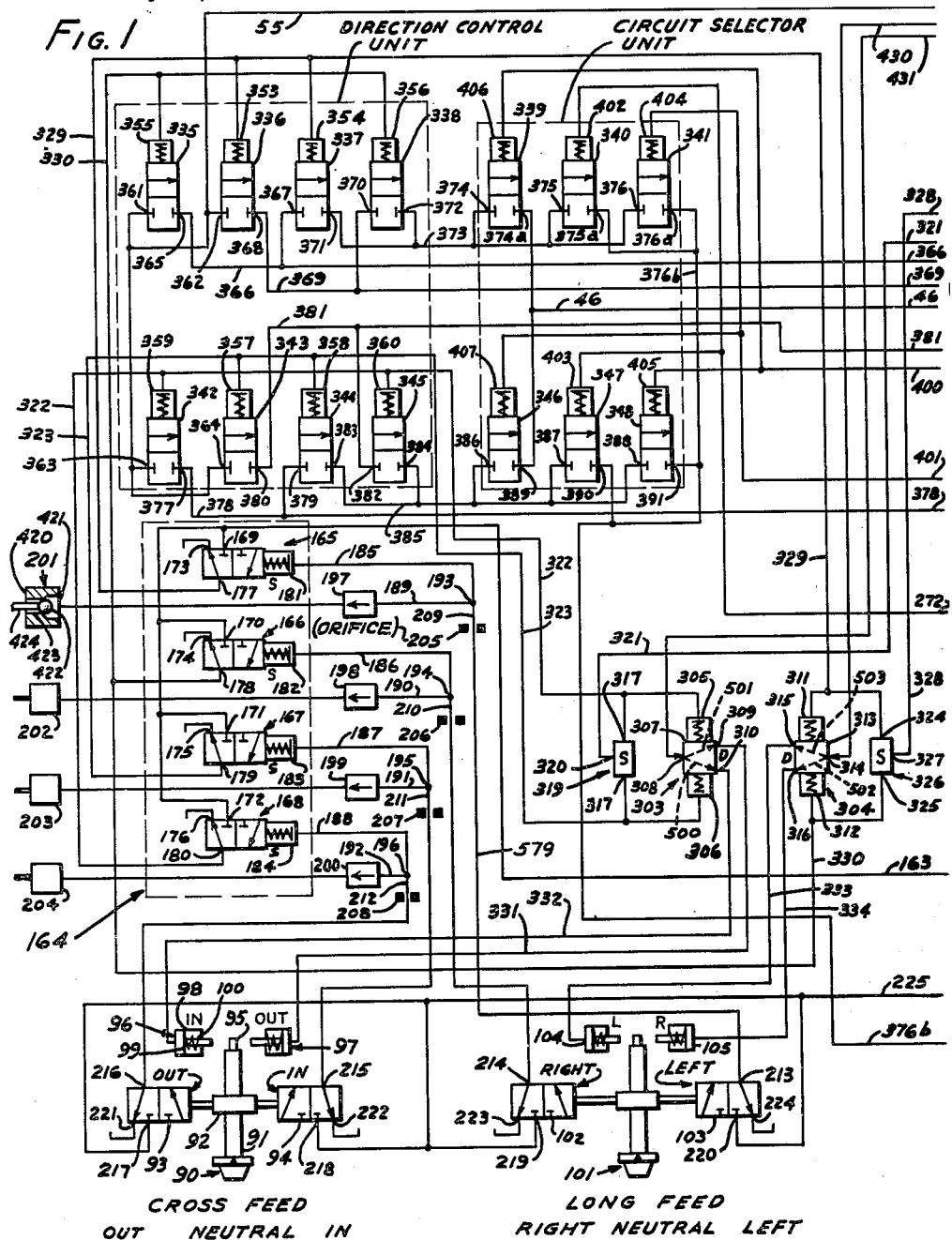

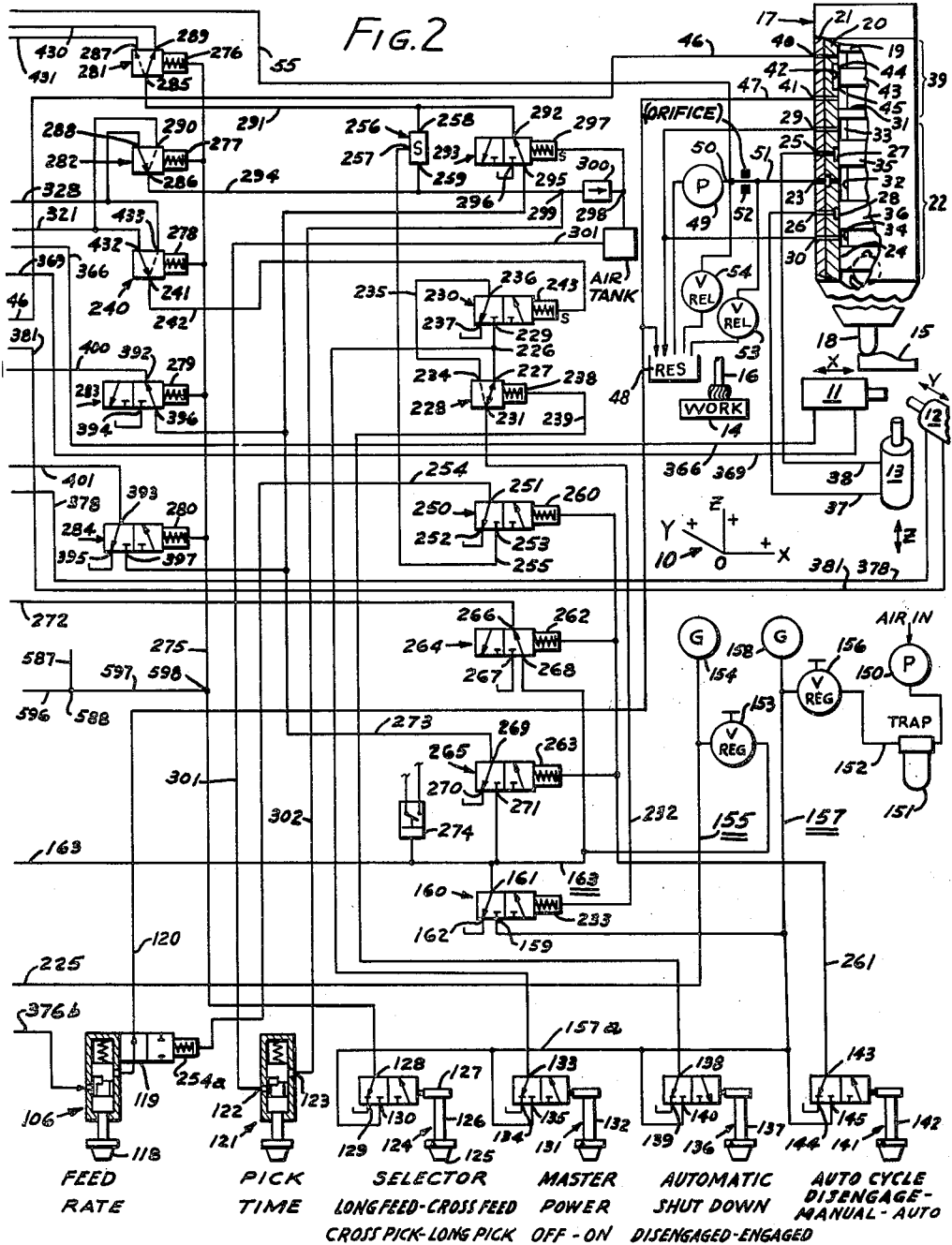
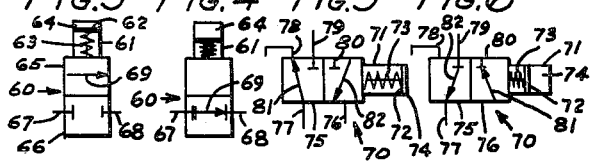

United States Patent Office 2,976,688
Patented Mar. 28, 1961

2,976,688

MACHINE TOOL CONTROL

Paul J. Weaver, Downey, Calif., assignor, by mesne assignments, to Banstrom Industries, Inc., Los Angeles, Calif., a corporation of Connecticut Filed May 18, 1959, Ser. No. 814,014

11 Claims. (Cl. 60—97)

This invention relates to machine tools, and in particular to a control system for controlling the relative movements of elements of machine tools.

This application is a continuation-in-part of applicant's co-pending application, Serial No. 780,434, filed December 15, 1958, entitled "Machine Tool Control."

In the cutting of a workpiece to reproduce the contour of a template therein, die-sinking being a familiar example, it is customary to provide a tracer valve in a first axis, usually vertical, which is adapted to move the knee of a milling machine either up or down in response to undulations of a template or pattern which is being copied. In order to move the tracer valve along the template, and the associated cutter along the workpiece, some type of motor is actuated which moves the milling machine table along a second axis, usually the axis of longitudinal feed, so that the tracer valve traces along a vertical plane in the template. Such a movement is herein called the "feed movement."

It is desirable to slow the feed rate in the horizontal axis when the tool must plunger into the workpiece to form a cavity, or when it must rise out of the workpiece to form a rising wall. This is for the reason that it is best to keep the feed speed approximately constant along the surface being generated by the cutter. Skillful die sinkers are able to approximate such an arrangement by eye, and numerous attempts have been made to accomplish this objective automatically. A means for accomplishing this reduction in speed automatically is shown in applicant's co-pending patent application Serial No. 748,426, filed July 14, 1958, entitled "Pattern Controlled Machine Tool." The instant invention is particularly useful in connection with the tool and control shown in the aforesaid co-pending application.

After the cutter has cut along one plane, it is desired for it to be stepped over along a third axis, usually but not necessarily the crossfeed, by an incremental distance so that the cutter may be fed relative to the workpiece along a new plane spaced from the first plane so as to machine the next section of the contour of the workpiece. Such a step feed is herein called a "pick movement."

Accordingly, the operation of a die sinker (and of three-dimensional reproduction work in general) consists of tracing back and forth in parallel, spaced apart planes which lie parallel to a first, usually longitudinal, axis while the table lifts and falls in a vertical axis to duplicate the undulations of the pattern in the workpiece, and stepping along the crossfeed axis at the end of each stroke. It is to be understood that the actions of the crossfeed and the longitudinal feed may be reversed so that the pick movement occurs along what has been described as the longitudinal axis, while the feed movement occurs along a plane that is parallel to what has been described as the crossfeed axis.

Automatically cycling machine controls customarily reciprocate between stops at the extreme ends of the workpiece. The reason the stops are located at the extremes of movement is to assure that the entire contour of the workpiece will be machined. Such an arrangement is necessary when a contour occupies a substantial proportion of the area of the workpiece. However, there are many machining situations wherein only a small part of a contour needs to be worked on, such as the wall of a cavity. Then it is a serious waste of machine time to require the cycle to go from stop to stop, when only a minor portion of the movement involves cutting action. Accordingly, machinists often control the cycling of the machine manually during such operations.

It is an object of this invention to provide means in an automatic cycling device, for automatically cycling the machine movements within restricted limits that are determined not by limit stops, but by means which are related to the particular portions of the work which need to be worked on.

According to this invention, means are provided which are responsive to the environment to be worked on, in combination with an automatic cycling control.

A preferred but optional feature of the invention resides in position-sensitive means which are responsive to one or more unique dimensional levels in a first axis on the pattern being duplicated, whereby the cycling movement along two other axes is controlled by relation to the position of the work along the first axis.

According to still another preferred but optional feature, the region in a workpiece to be worked on is surrounded by bounding means adapted to provide a cycling signal when the work has been machined to a desired limit relative to said bounding means.

The above and other features of this invention will be fully understood from the following detailed description and the accompanying drawings, in which:

Fig. 1 is a circuit diagram of one part of a control system in which the invention is adapted to function;

Fig. 2 is a circuit diagram of another part of the said control system, Figs. 1 and 2 being adapted to adjoin in edge-to-edge relationship;

Figs. 3–6 are schematic illustrations of the valve notation utilized in Figs. 1 and 2;

Fig. 7 is an elevation, partly in cutaway cross-section, showing details of one of the valves in the control system;

Figs. 8 and 9 are cross-sections taken at lines 8—8 and 9—9, respectively, of Fig. 7;

Fig. 10 is a side view, partly in cross-section, of another valve used in the control system;

Fig. 11 is a circuit diagram of the presently preferred embodiment of the invention;

Fig. 12 is a schematic drawing which explains the action of the circuit of Fig. 11 in terms of pneumatic pressures; and Fig. 13 is a fragmentary isometric view of an alternate means for actuating the circuit of Fig. 11.

The elements of a machine tool pertinent to a description of the instant invention are shown in the upper right-hand corner of Fig. 2. Certain conventional parts of the machine tool which are known to every skilled machinist are not shown in the drawings, in order to simplify the drawings. The machine operates along three principal axes, shown as the common left-hand cartesian coordinate arrangement 10, the coordinates being labeled X, Y and Z from an origin O, in accordance with common notation. The X axis is customarily known as the longitudinal feed, the Y axis the crossfeed, and the Z axis the knee feed for vertical movement.

In accordance with well-known machine tool construction, a worktable (not shown) is so supported and arranged as to be moved along the X, Y and Z axes, or in any combination thereof, as a result of operation X, Y and Z axis motors 11, 12, 13, respectively. These motors are shown as conventional cylinder-and-piston types, but it will be understood that these are simply illustrative examples of useful motors and that they could as well have been hydraulic gear-type motors, hydraulic cylinders, or any other variable speed motive means.

A workpiece 14 and a template or pattern 15 are customarily supported upon the worktable so as to be moved in unison, and a milling cutter 16 and a tracer valve 17 are supported by unitary supporting structure so as to retain their spatial inter-relationship. Therefore, movement of the template and workpiece in unison relative to the tracer valve and the cutter, respectively, will cause the cutter to duplicate in the workpiece the contour of the template or pattern.

For full details of tracer valve 17, reference may be had to the aforesaid co-pending application, Serial No. 748,426. However, a brief description of certain portions of this tracer valve that are pertinent to this invention will be given here. The tracer valve has projecting therefrom a pivotally-mounted stylus 18, the tip of which stylus is pivotable in any lateral direction relative to the X-Y plane, and is also reciprocable along the Z axis. Tilting movement of the stylus from its neutral vertical position will result in upward movement of a valve spool 19 in the tracer valve, as will upward movement of the stylus, while a downward movement of the stylus, or its return toward the vertical, will cause the valve spool to move downward.

The valve spool is contained in a valve sleeve 20, both of which are enclosed by a housing 21. The valve sleeve and valve spool are provided with staggered grooves for the purpose of appropriately directing and controlling the flow of hydraulic fluid in accordance with the position of the spool within the sleeve. The spool position is, of course, determined by the contact between the stylus and the template, and is therefore the direct controller on the machine for causing the machine to accurately duplicate the shape of the template in the workpiece.

The tracer valve has a lower 180° sector 22 (sometimes called a "tracer sector") which comprises a four-way valve. A central pressure port 23 through the housing and the valve sleeve opens into spool passage 24, and on each side thereof there are motor supply ports 25, 26 through the housing and sleeve which terminate at motor supply grooves 27, 28, respectively. These grooves extend circumferentially in the spool passage. Exhaust ports 29, 30 pass through the housing and the valve sleeve on opposite sides of the pair of motor supply ports and open into spool passage 24.

The valve spool is provided with a dividing land 31. Below the dividing land there are formed three circumferential grooves. The first is a central pressure groove 32 which stands opposite the pressure port 23 and remains continuously in communication therewith. Exhaust grooves 33, 34, each of which is in constant communication with exhaust ports 29, 30, respectively, are on opposite sides of groove 32. Lands 35, 36 are between pressure groove 32 and exhaust groove 33 and between groove 32 and groove 34, respectively. Lands 35, 36 are respectively opposite motor supply grooves 27, 28. When the spool is shifted one way from the neutral position shown, it will be seen that one of the lands will shift off of its respective motor supply groove so as to open the groove to pressure from the pressure groove, and the other land will move off the other groove so as to connect it with its respective and adjacent exhaust groove. This permits flow of fluid under pressure to one or the other of Z axis supply conduits 37, 38, which are connected to the Z axis motor, and flow to exhaust from the other conduit operating Z axis motor in one direction. Shifting the spool the other direction from the neutral position shown will cause fluid to flow in the opposite directions in the conduits, and move the motor in the other direction.

The tracer valve also has an upper feed control sector 39. This sector is provided with a pair of ports 40, 41 which pass through the housing and sleeve and open into the spool passage above the dividing land 31. A by-pass groove 42 is formed in the wall of the spool passage and extends circumferentially. A land 43, which has a lesser axial length than the width of by-pass groove 42, stands opposite the by-pass groove and with the spool in the centralized position as illustrated, permits fluid to flow between ports 40 and 41 through restrictions 44, 45 formed between the groove and land 43 at each end of the land. It will be appreciated that whichever way the spool moves from the neutral position shown, one of these restrictions will be decreased in area and that the volume which can flow between the ports will thereby be reduced. Greatest flow between ports 40 and 41 can occur when the valve is in its neutral position as shown. An inlet conduit 46 connects with port 40 while an exhaust conduit 47 connects with port 41. Conduit 47 discharges into a reservoir 48.

A hydraulic pump 49 withdraws fluid from reservoir 48 and pressurizes the same. The pump outlet is connected to a T-joint 50. A tracer valve supply conduit 51 branches from the T and connects to pressure port 23 in the tracer valve. An orifice 52 of dimensions to be discussed is fitted in supply conduit 51. A first relief valve 53 is fitted in the supply conduit between the tracer valve and orifice 52, and a second relief valve 54 is fitted in the conduit between the T-joint 50 and the pump. From T-joint 50 a feed supply conduit 55 passes to the control circuit to be described.

The operation of the equipment described thus far is briefly as follows. The lower 180° tracer sector 22 of the tracer valve controls the operation of the axis motor to raise or lower the knee in accordance with the contact between the template and the stylus. It is this up-and-down movement which will hereafter be termed "tracer movement." The upper rate control sector 39 of the valve will be connected through the control system to be described to one or the other of the X or Y axis motors. The movement of whichever motor is controlled by sector 39 will be called the "feed movement," and it will be observed that there will be a maximum rate of movement which occurs along the axis controlled by sector 39 when the spool is in the neutral position shown in Fig. 2. Whenever the spool is displaced in either direction from the central position, then the rate of flow through the sector will be cut down so that the rate of fluid flow to the motor operating as feed motor will be diminished. It is this modulated rate of feed, coordinated with the up-and-down movement of the Z cylinder motor, which results in a sensibly constant rate of movement of the cutting tool along the surface of the workpiece in which the desired contour is being generated.

The remaining motor X or Y which is not under control of sector 39 will be operated step-wise in a movement called "pick movement" which will step over the worktable each time a feed stroke is completed. It will be understood that it is most desirable and in the control system to be described the result is attained, that the X and Y axis motors will be intermittently actuated; that is to say, pick movement will occur only at the end of feed strokes. It is one purpose of the control system which is to be described to set forth a means of providing for the intermittent operation of the X and Y motors, and to enable this movement to be automatic.

It is to be appreciated that the Z motor is actuated entirely independently of the control system which is to be described, the control system being effective in the system only in one plane, in the case illustrated, the X-Y plane. Thus the control system determines the direction the table is to move, and controls the pick movement. The rate of feed movement, and the rate and direction of tracer movement are controlled by the tracer valve.

The control system as shown utilizes compressed air as a signal and actuating means to control the operation of valves which themselves select the direction of flowing of hydraulic fluid to the motors. It is to be understood that the various valves are in effect switches and that, while the use of pneumatic force for pilot actuation to control hydraulic liquid as an actual working fluid is given as a single and the preferred example, it is also possible to design analogous systems which fall within the scope of this invention which utilize other power sources, such as electrical or electronic control of hydraulic or electric motors, pneumatic control of electric motors, etc. It has been found that in a machine tool, the use of compressed air for actuating control devices and for carrying signals has many advantages, not the least of which is the fact that if a leak occurs, there is no hydraulic fluid to spill on the floor. Also, considerable forces can be obtained even when small lines are used. For example, in the valve shown in Fig. 10, which is extensively used in this system, 100 pounds of direct force are needed to move the hydraulic control sector. Were an electric solenoid to be used for such a purpose, a very large solenoid carrying a heavy current would be required to produce this much force. Such an installation would be impractical, because of the heavy currents needed, and because the bulk of the equipment would be far greater than is tolerable.

On the other hand, with the use of compressed air, relatively small valves can be used which are capable of utilizing air pressures between 30 and 90 pounds per square inch, and this enables a large operating force to be obtained in a small valve. A small control box can then be used. In fact, the entire extensive system shown in Figs. 1 and 2 has in actual practice been contained in a pair of boxes whose total volume does not exceed about one cubic foot. Such a small bulk is simply not attainable when other types of energy, particularly electrical, are used.

Inasmuch as this control system is quite extensive and utilizes many valves having various choices of settings, the standard and well-known JIC system of notation has been used for indicating the actuated and unactuated conditions of the valve. Although this system is well-known, two examples of the notation are shown in Figs. 3-6 which will be explained at the present time in order to make the remainder of the application intelligible. Figs. 3 and 4 show an unactuated and actuated condition of a valve 60. The physical construction of this valve is shown in Fig. 10, and will be fully described below. In Fig. 3 an upper section 61 illustrates the control portion of the valve. There is a line 62 which schematically shows a diaphragm or piston which is movable by pneumatic pressure. A spring 63 biases the diaphragm to its unactuated condition. A space 64 above line 62 is relatively small in Fig. 3, to indicate that there is no actuating pressure at the condition illustrated.

There are two lower sections 65, 66 in the notations. These illustrate the hydraulic valving portion. The lower section has terminals 67, 68, which terminals comprise hydraulic fluid connections to the valve. The upper section 65 contains an arrow 69 which represents a hydraulic connection which can be made by valve 60.

In the JIC system of notation, actuation or deactuation of the switch will reverse the section in which the arrows stand. For example, in Fig. 3 the valve is shown by the small space 64 as unactuated and arrow 69 is in section 65. No arrow connects terminals 67 and 68, and this indicates no flow connection between them. There are no terminals joined by the arrow in Fig. 3. The valve is closed.

In Fig. 4 space 64 is shown larger, with line 62 moved down, as though by pressure applied to the upper section 61. This means that the valve is in its other condition, and it will be noted that the arrow 69 has moved into the lower section. There having been no arrow in section 66, this "notation" of no arrow has moved into section 65. It will now be seen that in Fig. 4 there is a direct fluid connection between terminals 67 and 68. Therefore, Figs. 3 and 4 show as an off-on valve in which fluid flow is cut off between the terminals when the valve is unactuated, and which makes fluid communication between the terminals when the valve is actuated.

Figs. 5 and 6 show another example of this actuation. They illustrate a selector valve 70. The selector valve has an actuation section 71 having a line 72 with an indication of a bias spring 73. In Fig. 5 the device is shown in its unactuated condition with a space 74 which is relatively small, indicating that there is no actuating pressure against the diaphragm or piston which is symbolically indicated by line 72. On the other hand, in Fig. 6 space 74 is shown much larger, and line 72 has been moved to the left, indicating that actuating pressure is on in the actuating section.

Selector valve 70 is shown as having two hydraulic control sections 75, 76. Control section 75 has a common inlet 77 and two terminals 78, 79. The term "common" port, or "Common" inlet will frequently be used herein to describe a port which is capable of being connected to different ones of other ports.

Terminal 78 has a small hook on its end indicating that it is a vent. Another terminal 80 is shown in section 76, but it will be observed that it does not pass outside the schematic illustration of a case. Such a notation means the terminal is plugged off and is not used for a fluid connection. It illustrates one detail of the physical construction of the valve and is of no interest to the actual circuit through the valve.

A pair of arrows 81, 82 is provided. As shown, arrow 81 inclines upwardly to the left and arrow 82 inclines downwardly to the left, and they are disposed respectively in sections 75 and 76 when the valve is unactuated as shown in Fig. 5. At that time the common inlet 77 is connected by passages symbolically indicated by arrow 81 to terminal 78 which means that that inlet is vented. The arrows show the direction of flow.

When the valve is actuated, as shown in Fig. 6, the arrows switch blocks, and it will be seen that arrow 82 is now in block 75 while arrow 81 is in block 76. At this time terminal 79 is connected to inlet 77 while the vent is closed off. It is believed that the above will sufficiently indicate the use of the standard JIC notation.

Certain manually adjustable parts of the control circuits will now be described. There is a cross-feed control handle 90 which has a shaft 91 that includes a cam 92 for actuating a pair of valves 93, 94. The cam is designed with a single rise so that when moved to the left in Fig. 1 the left-hand valve is actuated, and when moved to the right the right-hand valve is actuated. When in its central position as shown, neither valve is actuated.

At the upper end of the shaft there is an arm 95 which is positioned between two spring-loaded actuators 96, 97. These actuators are pneumatically operable. Each includes a cylinder 98, a plunger 99 and a spring 100, which biases the plunger away from the arm. When one of the actuators is actuated, the plunger strikes the arm and moves the arm away from it, thereby turning the shaft so that the cam actuates one or the other of valves 93 or 94, depending on which of the actuators is operated.

There is a longitudinal feed control handle 101, which controls valves 102, 103 and which is operable by actuators 104, 105 in the same manner as cross-feed handle 90. It will be appreciated that both handles 90 and 101 are exposed for access by the machinist and, as will be seen below, can be used to determine the direction of table movement, and to provide for operation as a conventional milling machine.

A feed rate valve 106 is shown installed in the circuit in Fig. 2. This valve is shown in full structural detail in Fig. 7, to which reference should now be had. The valve includes a housing 107 which has an inlet 108 and an outlet 109. A circular cylindrical spool passage 110 is formed in the housing. At the top of the spool passage, disposed between the housing and a valve spool 111, there is a bias spring 112 which presses the spool downward in Fig. 7 so that it tends to make contact with a cap 113 or with some other restraining element attached to the housing.

The spool has a circumferential groove 114, which groove is modified by a diametrical notch 115 that extends across about one-half of the area of the groove. The upper edge 116 of the notch tends to widen the notched part of groove 114. Outlet 109 is a substantially 180° slit through the wall of the housing. The outlet is "walled in" as appropriate, so that fluid from the outlet can flow out a small port.

Both outlet 109 and notch 115 subtend slightly less than 180°, so that the rotational position of the spool in the housing shown in Fig. 7 the notch and the outlet do not overlap. At this position, the groove is not wide enough to overlap any part of the outlet and there can therefore be no flow through the feed rate of valve at that position. However, the upper edge 116 of the notch is high enough from the cap that it would, if properly situated angularly, overlap a portion of the outlet, and therefore permit restricted flow between the inlet and the outlet.

As can best be seen from Figs. 7 and 8, if the spool were rotated slightly, there would be an overlap between edge 116 and outlet 109 and this overlap will be a small one, permitting metered flow between inlet and outlet. The amount of the flow would, of course, be increased by increasing the area of the flow orifice by turning the spool farther and farther so that more and more of the notch 115 comes into registration with outlet 109. The maximum flow possible with the spool in its lowermost position, as shown in Fig. 7, would occur when the spool is turned about 180° away from the position shown in Fig. 7.

In the event that a quicker movement is desired for the machine tool element whose rate is limited by this valve, rapid traverse is provided for by shift 117 which connects to handle 118. Regardless of the angular position of the spool in housing 107, if the spool is shifted by pressing on handle 118, the groove will come into registration with the outlet, and a large volume flow can occur from inlet to outlet. This provides for a quick traverse movement.

When force is taken off shaft 117, bias spring 112 restores the spool to its lowermost position, as shown, and then the flow through the valve is again regulated entirely as a function of overlap between edge 116 and outlet 109. Feed rate valve 106 has its outlet governed by a valve 119, which valve is a standard off-on type controlled by actuator 254a (Fig. 2). The outlet 109 is connected to terminal of valve 119 and the outlet of valve 119 is connected to an exhaust conduit 120.

A pick timer valve 121 is also attached to the control panel of the instrument. It comprises a valve structure which is identical to that of feed rate valve 106. Timer valve 121 has terminals 122 and 123 through which the passage of air is controlled. Valves 106 and 121 differ in their operation in that valve 106 controls flow of hydraulic fluid, while valve 121 controls flow of air. The construction of timer valve 121 can be made the same as that of valve 106, thereby reducing the number of custom components in the system.

A selector valve 124 has a handle 125 mounted to the control panel. The handle is connected to a shaft 126 which carries a cam 127 for placing the selector valve in one or the other of two conditions. As shown in Fig. 2, the selector cam is in the left-hand position so that connections are made as indicated by the arrows. It will be understood that if the selector handle were turned to its other position that the locations of the arrows would be exchanged. Valve 124 has a common port 128, a vent port 129, and a pressure port 130. Valve 124 operates to connect the common port selectively to the vent port or to the pressure port.

A master power valve 131 has the same construction as valve 124 with a similar handle, shaft, and cam arrangement 132. The valve includes a common port 133, a vent port 134, and a pressure port 135. The master power valve 131 selectively interconnects the common port to the vent port or to the pressure port.

An automatic shutdown valve 136 is also mounted to the control panel and has a handle, shaft, and cam arrangement 137, the same as valve 124. The automatic shutdown valve has a common port 138, a vent port 139, and a pressure port 140.

Similarly, an automatic cycling disengage valve 141 has a handle, shaft, and cam arrangement 142, the same as selector valve 124. This valve is shown in its unactuated position. Disengage valve 141 has a common port 143, a vent port 144, and a pressure port 145.

Air for powering the pneumatic components of this invention is supplied from a pump 150, which may form part of a shop air supply system, the air passing through a filter and water trap 151 and entering a supply line 152. A regulator 156 is connected to supply line 152. Regulator 156 will be set to deliver air to approximately 80 p.s.i. Output air from regulator 156 is for actuating certain hydraulic control devices, as opposed to signal operations, its pressure being provided in order to deliver the greater forces needed for actuation purposes than for signal operation.

The output from regulator 156 goes to a control air supply line 157, there being a gauge 158 in that line. Line 157 connects to a pressure port 159 in a master power relay valve 160. Valve 160 also has a common port 161 and a vent port 162. Line 157 also connects to a manifold 157a.

A control air line 163 extends from common port 161 to connect the pressure ports of valves in a reversing unit 164. Reversing unit 164 utilizes four snap-action valves 165, 166, 167, 168, which have the flow characteristics explained in connection with Figs. 5 and 6. The subscript "S" is placed adjacent to the actuating section of each of valves 165–168 to indicate that the valves do not hunt between one position and the other, but when there is sufficient actuating power to accomplish it (a pressure above some critical level), it will snap to its actuated position, and when the pressure falls below the critical level, will snap back to the unactuated position. These valves never occupy an intermediate position.

Line 163 also connects to the inlet side of a regulator 153, that has a regulated output of about 30 p.s.i.g. (pilot pressure). A gauge 154 is connected in a pilot pressure line 155 which receives air at pilot pressure. Pilot pressure line 155 is connected to an off-on signal line 225.

Line 163 connects to pressure ports 169 of valves 165–168, respectively. Each of these valves has a vent port 173, 174, 175 and 176, and a common port 177, 178, 179, 180, respectively. It will subsequently be seen that valve 165 controls movement of a machine longitudinally to the left (minus X axis movement), valve 166 longitudinal movement to the right (positive X axis movement), valve 167 inward cross-feed movement (positive Y axis movement) and valve 168 outward cross-feed movement (minus Y axis movement).

Valves 165–168 each possesses actuating mechanism shown schematically by numerals 181, 182, 183, and 184. Conduits 185, 186, 187, 188 connect with actuating mechanisms 181–184, respectively. Signal conduits 189, 190, 191 and 192 respectively connect with conduits 185, 186, 187 and 188 at terminals 193, 194, 195 and 196. Check valves 197, 198, 199 and 200 are connected in signal conduits 189–192, and permit the passage of fluid away from the respective terminals toward trip devices 201, 202, 203 and 204.

Orifices 205, 206, 207 and 208 are connected in conduits 209, 210, 211 and 212, which are in turn connected to terminals 193, 194, 195 and 196. Conduits 209–212 connect respectively to common ports 213, 214, 215 and 216 of selector valves 103, 102, 94 and 93. Valves 93, 94, 102 and 103 also have charging ports 217, 218, 219, 220 and vent ports 221, 222, 223 and 224, respectively.

Charging ports 217, 218, 219 and 220 are all connected to an off-on signal line 225. Common port 133 of valve 131 connects to a terminal 226 which interconnects a first port 227 of a two-position valve 228 and a first port 229 of a snap-acting valve 230. The common port 231 of valve 228 is connected by conduit 232 to the actuator 233 of master power relay 160. The second port 234 of valve 228 is connected by a conduit 235 to the common port 236 of snap-acting valve 230. Valve 230 also has a vent port 237. Valve 230 is a snap-acting valve in the same sense as valves 165–168 in that it does not hunt for a position, but assumes one position or the other when actuator pressure is on one side or the other of a critical level. Valves 228 and 230 comprise the control elements of an automatic shutdown circuit. Actuator 238 of valve 228 is connected via auto-shutdown signal conduit 239 to common port 138 of automatic shutdown valve 136. A valve 240 of the same type as valve 228 has a common port 241 which is connected by a conduit 242 to the actuator 243 of snap-acting valve 230. Valve 240 also forms a part of the automatic shutdown circuit.

A pick lockout valve 250 includes a common port 251, a vent port 252 and a third port 253. A conduit 254 connects common port 251 with actuator 254a on feed rate valve 106. Conduit 255 interconnects third port 253 of the pick lockout valve with a shuttle valve 256. Shuttle valve 256 has a common port 257 (to which conduit 255 is connected) and two other ports 258, 259. In accordance with well-known shuttle valve action, this valve acts to connect common port 257 with one or the other, but never both simultaneously, of ports 258 and 259.

Pick lockout valve 250 includes an actuator 260 which is connected to a selector line 261. There are also connected to line 261 actuators 262 and 263 which serve respectively to actuate a conventional feed pilot valve 264 and an automatic feed pilot valve 265.

Valve 264 has a common port 266, a vent port 267 and a third port 268. Third port 268 is connected to air line 163. Valve 265 has a common port 269, a vent port 270 and a third port 271. Third port 271 is also connected to control air line 163. Common port 266 or valve 264 is connected to a control conduit 272. Common port 269 of valve 265 is connected to a control conduit 273.

A pressure switch 274 is connected to control air line 163 and serves to cut off electric power to the entire machine tool if pressure in control air line 163 falls below the level necessary to exert positive control over the control circuits.

Port 128 of selector valve 124 is connected by conduit 275 to actuators 276, 277, 278, 279 and 280 of valves 281, 282, 240, 283 and 284, respectively. Valves 281 and 282 act as selector valves for the automatic actuators 96, 97, 104 and 105. Valves 281 and 282 respectively have common ports 285, 286 and first ports 287, 288 and second ports 289, 290. Common port 285 of valve 281 is connected by a conduit 291 to port 258 of shuttle 256, and also to the common port 292 of a timer valve 293.

Common port 286 of valve 282 is connected by conduit 294 to port 259 of shuttle valve 256 and also to a third port 295 of timer valve 293. Valve 293 has a vent port 296.

Actuator 297 of timer valve 293 is connected to a terminal 298. Conduit 294 is connected to a terminal 299. A one-way check valve 300 is connected between terminals 298 and 299 permitting flow of air from terminal 299 to terminal 298, but not the reverse. Terminal 298, and therefore actuator 297, of the timer valve are connected via conduit 301 to terminal 122 of pick timer valve 121. Conduit 301, and conduit 302 which is connected to terminal 122 of the pick timer valve and to terminal 299 together enclose a volume of space which is to be charged and discharged with air (shown schematically as "vol" in conduit 301). Conduits 301 and 302 are sometimes collectively called the "timer line."

Direction control actuator relays 303, 304 are shown in Fig. 1. Relay 303 comprises a pair of actuators 305, 306 which operate on opposite sides of a selector valve 307. The notation "D" next to relays 303 and 304 identifies these relays as detent-type relays; that is to say, the selector valve itself will retain the position at which it was last set until that position is changed by actuation of the actuator which did not establish said last position. Selector valve 307 has a common port 308 and a first and second port 309, 310 respectively.

Relay 304 has actuators 311, 312 which act upon a selector valve 313 that has a common port 314 and first and second ports 315, 316, respectively. Actuators 305 and 306 are respectively connected to opposite ports 317, 318 of a shuttle valve 319. The common port 320 of the shuttle valve is connected to a conduit 321. Actuator 305 is further connected to conduit 322, while actuator 306 is further connected to a conduit 323.

Similarly, actuators 311 and 312 are connected to ports 324 and 325, respectively, of a shuttle valve 326. The common port 327 of the shuttle valve is connected to a conduit 328. Actuator 311 is also connected to a conduit 329, while actuator 312 is also connected to a conduit 330. First and second ports 309 and 310 of selector valve 307 are connected to power conduits 331, 332 which are respectively connected to actuators 97 and 96 for determining the position of the cross-feed control handle.

Similarly, first and second ports 315 and 316 of selector valve 313 are connected to power conduits 333 and 334, which are respectively connected to actuators 104 and 105 for adjusting the position of the longitudinal feed control handle.

The above mechanism and circuits are all provided to determine which way the cross-feed is to move, that is, in or out; which way the longitudinal feed is to move, that is, right or left; and which of the cross-feed or the longitudinal feed is to be operated as a pick movement, and the other as a feed movement. Furthermore, it is the purpose of the above circuitry to determine whether the operation is to be automatic or if it is to be conventionally controlled, that is, by manually sequenced operations.

To this point, the various pneumatic connections have been discussed and it is now appropriate to discuss the units which will themselves control the flow of hydraulic fluid to the appropriate side of the appropriate fluid motors for powering the movement of the machine's table. The basic elements for carrying out the switching of hydraulic fluid are two blocks of valves bracketed in the drawings and labelled "directional control unit" and "circuit selector unit." Before entering into a detailed discussion of the individual valves and their operation, the basic theory of operation of certain of these valves will be discussed. Consider selector valves 335, 336, 337, 338 in the direction control unit. It will be observed that the actuators for valves 335 and 338 are both connected to conduit 330, and that the actuators for selector valves 336 and 337 are connected to conduit 329. As it happens, one of these signal conduits will be under pressure while the other is vented. Therefore, the valves will be actuated in pairs; that is, valves 335 and 338 will be actuated while valves 336 and 337 are not, or valves 336 and 337 will be actuated while valves 335 and 338 are not. The result is that the bank of selector valves 335–338 acts as a four-way valve which will determine in the case of those valves whether hydraulic pressure provided to the X axis motor makes the motor run to the right or to the left.

In the circuit selector unit there are selector valves 339, 340 and 341. Valve 339 will, when actuated, direct the exhaust from the X axis motor operation to conduit 46 and through the upper sector 39 of the tracer valve, so that the rate of motor operation will be modulated by the tracer valve (when X axis movement is "feed movement" and valve 339 is actuated).

Selector 340 will, if actuated, direct the exhaust in such a manner as to bypass the tracer valve and enable the macine tool to be operated as a conventional milling machine.

Selector valve 341 will, when actuated, run the exhaust from X axis motor through circuits which will limit its operation to pick movement.

Therefore, selector valves 339, 340 and 341 may conveniently be designated feed control valve, conventional control valve and pick movement control valve, respectively.

There is a second similar bank of selector valves 342, 343, 344 and 345 which operate to control the Y axis motor. These correspond in their actions to selector valves 335–338, and in the circuit selector unit there are selector valves 346, 347 and 348 which correspond to selector valves 339–341. Therefore, it will be seen that provision is made for determining which way the table will move in each of the X and Y axes and what kind of movement will be attained when pressure is on the motor to move it in that direction.

Now to a more detailed description of the operation of the circuit. Conduits 329, 330, 323 and 322 are respectively connected to common ports 177, 178, 179 and 180 of snap-action valves 165–168. It is the compressed air passed from the control air line 163 by these four valves 165–168 which determines the setting of the members of the direction control unit and also determines the adjustment of actuators of valves 93, 94, 102 and 103. The condition of the valves in the circuit selector unit is determined by valves 283 and 284 of which more will be said below. Conduit 329 controls movement of the X axis motor to the left relative to the coordinate scheme, and is connected to actuators of valves 353 and 354 of selector valves 336 and 337, respectively.

Air in conduit 330 controls movement of the X axis motor to the right relative to the coordinate system and is connected to actuators 355 and 356 of selector valves 335 and 338, respectively.

Conduit 323 connects with actuators 357 and 358 of selector valves 343 and 344, respectively. Air from conduit 323 controls the movement of the cross-slide inwardly, that is, in the plus Y direction of the coordinate system.

Conduit 322 is connected to actuators 359 and 360 of selector valves 342 and 345, respectively. Air in conduit 322 controls outward movement out of the cross-slide, that is, minus Y movement in the coordinate system.

Hydraulic pressure from feed supply conduit 55 is provided to pressure ports 361 and 362 of selector valves 335 and 336, respectively. Pressure is also provided to pressure ports 363 and 364 of valves 342 and 343. This is the source of fluid pressure for actuating both the X and Y movements of the table, and it is the function of the valves in the direction control unit to select which direction the motor is to be moved. It is the function of the valves in the circuit selector unit to determine the manner in which the pressurized fluid thus applied is permitted to actuate the motors, that is, pick movement or feed movement.

Outlet port 365 of valve 335 is connected to conduit 366, which is connected to the side of X axis motor which will cause the motor to move the table to the right, that is to say, plus X axis movement. Conduit 366 is also connected to a first port 367 of valve 337. Outlet port 368 of valve 336 is connected to conduit 369, which conduit is connected to that side of the X axis motor which will cause the table to move in the minus X direction along the coordinate. Conduit 369 is also connected to a first port 370 of valve 338. Second ports 371, 372 of valves 337 and 338, respectively, are both connected to a manifold 373 to which the first ports 374, 375 and 376 of valves 339, 340 and 341 are connected. The second port 374a of valve 339 is connected to inlet conduit 46 of the tracer valve. Second ports 375a and 376a of valves 340 and 341 are both connected to exhaust line 376b.

The circuit selector valves will determine that the exhaust from either the crossfeed or the longitudinal feed will be selected to pass through inlet conduit 41 to the tracer valve and cause feed movement, while the other will be caused to flow to valve 106 and cause pick movement.

Outlet port 377 of valve 342 is connected to conduit 378, which conduit is connected to the side of the Y axis motor which will cause the crossfeed to move in the minus Y direction. Conduit 378 is also connected to a first port 379 of valve 344.

Outlet port 380 of valve 343 is connected to conduit 381. Conduit 381 is connected to that side of the crossfield Y axis motor which will cause the motor to move the table in the plus Y direction. Conduit 381 is also connected to a first port 382 of valve 345.

Second ports 383 and 384 of valves 344 and 345, respectively, are both connected to a manifold 385, which manifold is connected to the first ports 386, 387, 388 of selector valves 346, 347 and 348, respectively. Second port 389 of valve 346 is connected to inlet conduit 46. Second port 390 of valve 347 and second port 391 of valve 348 are both connected to exhaust line 376b.

Pilot selector valves 283 and 284 (Fig. 2) have common ports 392, 393, vent ports 394, 395 and pressure ports 396, 397, respectively. The pressure ports of both valves 283 and 284 are connected to conduit 273. The common port 392 of valve 283 is connected to line 400 and the common port 393 of valve 284 is connected to line 401.

Actuators 402 and 403 are connected to line 272. Actuators 404 and 407 are connected to line 401. Actuators 405 and 406 are connected to line 400.

Trip device 201 is shown in detail in Fig. 1, it being understood that trip devices 202, 203 and 204 are similar. Trip device 201 includes a valve body 420 having a ball seat 421 and a ball 422 therein. The ball when seated shuts off flow between conduit 189 and a passage 423 in the valve body. The ball can be unseated by contact with a dog 424. The dog is attached to a relatively immovable portion of the machine tool along the axis concerned, and the ball is unseated by the dog when the worktable moves to the end of its stroke.

With respect to device 201 it is desired to make contact and reverse the movement of the machine when the table has moved as far as desired longitudinally to the left, that is, at the conclusion of minus X movement. As will be seen below, contact of the dog with the ball will dump the air from conduit 189 and this will reverse the machine.

The dog in trip device 202 will cause the device to stop its movement to the right (plus X), contact with the dog in device 203 will stop movement in the plus Y direction and contact with the dog in trip device 204 will stop movement in the minus Y direction.

Common port 314 of valve 315 is connected by conduit 430 to port 289 of valve 281. Port 308 of valve 307 is connected by conduit 431 to port 287 of valve 281. A first port 432 and a second port 433 of valve 249 are respectively connected to conduits 321 and 328.

The physical construction of valve 335 which is exemplary of all the valves in the direction control unit and the circuit selector unit, is shown in Fig. 10. Fig. 10 particularly illustrates valve 335. Valve 335 has a hydraulic sector 435 and an actuator sector 355. The hydraulic sector has a body 436 in which ports 361 and 365 are formed. These ports intersect a bore 437. Bore 437 is closed by a plug 438. Within the plug, there is a poppet 439, which poppet has a reduced section 440. At the end of the reduced section there is attached a seat member 440a which is adapted to contact a seat 441 in the bore so as to control flow between ports 361 and 365.

The valve is shown in an unactuated closed condition with the seat member 440a against seat 441, and with pressure off in the signal port 442 of the actuator. At the right-hand end of the poppet there is a backing member 443 which is abutted by a diaphragm 444, the diaphragm being attached between the body and a cap member 445. A signal chamber 446 is formed inside the cap and closed by the diaphragm. A bias spring 447 biases the poppet to the valve closed position.

It will be seen that with pressure off in signal chamber 446 the bias spring will tend to cause the seat member to close the hydraulic sector of the valve. When the valve is actuated by placing pressure in chamber 446 the poppet is moved to the left and passage is open between the ports 361 and 365. This is the physical embodiment indicated by the JIC notation of valve 335 in Fig. 1.

Fig. 11 shows a "perimeter turnaround" circuit in this invention. The purpose of this circuit is to cause the feed movement along a longitudinal axis to reverse whenever a given vertical level is reached on a pattern; as will be shown below, the level may either be a high or low level, or both, as desired. For example, in finishing the wall of a cavity, it is desirable to reverse the feed movement as soon as the cutter has climbed to the top of the cavity, and again as soon as the cutter has descended to the bottom of the cavity. The wall can then be machined without traveling all the way across the cavity, thereby eliminating useless motion.

A trip device 550 is related to the vertical axis in the same manner as trips 201–204 are related to their respective horizontal axes. Trip device 550 is identical with device 201, having a bleed port 551, a ball seat 552, a ball 553, and a dog 554. The ball is biased toward the seat so as to normally close the port. For this purpose, the ball may be spring-loaded or otherwise biased toward the seat, if desired. It will be understood that a trip device of this sort may have a number of physical configurations, and that the particular configuration shown is no limitation on the invention.

The dog is adapted to engage a stop 555. Stop 555 is illustrated as a crowned device, the orifice and stop relatively moving along a vertical axis. The dog is unseated by the stop, but can ride up onto the crowned surface so it will not berak off if the machine overtravels the stop. The trip device and the stop are attached to different relatively movable elements of the machine tool so that as the machine tool element goes upward or downward, depending on the orientation of the element, the stop will tend to strike the dog, unseat the ball, and permit flow of air out of the bleed port. The stop and dog may be adjustably placed on the machine tool so that the relative vertical position of the respective machine tool elements at which engagement of the stop and dog occurs can be selected. This engages the device to reverse the feed line action at any desired tool elevation relative to the workpiece.

A conduit 556 is connected to the trip device and discharges into the bleed port. An orifice 557 is placed in conduit 556. On the other side of the trip device from the orifice, a shuttle valve 558 is connected to conduit 556, and serves to connect conduit 556 to one or the other of conduits 559, 560.

Conduit 559 is connected to a junction 561, to which junction is also connected the actuator 562 of an off-on valve 563. Valve 563 has two ports 564, 565. Conduit 559 is connected to port 564.

To junction 561 there is also connected a conduit 566 which includes an orifice 567, said conduit being connected to another junction 568. Port 565 is connected to junction 568 by conduit 568a. Also connected to junction 568 is a conduit 569.

Conduit 560 is connected to a junction 570, to which junction is also connected the actuator 571 of an off-on valve 572. Valve 572 has two ports 573, 574. Conduit 560 is connected to port 573.

To junction 570 there is also connected a conduit 575 which includes an orifice 576, said conduit being connected to another junction 577. Port 574 is connected to junction 577 by conduit 577a. Also connected to junction 577 is conduit 578.

Attention is called to conduit 579 in Fig. 12, which discharges through orifice 205 and conduit 209 to junction 193. Junction 193 is shown in Figs. 1 and 11. Conduit 579 is shown in schematic representation in Fig. 12, also so as to provide a complete illustration and explanation of the connections of one representative part of the circuit of Fig. 11.

A selector valve 580 has one port 581 connected to conduit 578. Its second and third ports 582 and 583 are connected by conduits 584 and 585, to junctions 195 and 193, respectively. Its actuator 586 is connected by conduit 587 to a junction 588.

The location of junctions 193 and 195 in the basic control system will be found in the central left-hand portion of Fig. 1, while junction 588 will be found in the left-hand central portion of Fig. 2.

A selector valve 589 has one port 590 connected to conduit 569. Its second and third ports 591 and 592 are connected by conduits 593 and 594, to junctions 196 and 194, respectively. Its actuator 595 is connected by conduit 596 to junction 588.

Junction 588 is connected by conduit 597 to junction 598 (Fig. 2). Junction 598 is in the conduit connected to port 128 of selector valve 124.

The initials "NC" by the actuators in Fig. 11 show that valves 563 and 572 are normally closed in their unactuated condition.

In Fig. 12 the pneumatic scheme of the circuit of Fig. 11 and its combination with certain elements that are shown in Figs. 1 and 2, is set forth. Certain elements shown in schematic notation in the other figures are given physical significance.

In Fig. 13 there is shown still another embodiment according to the invention. In Fig. 13 there is a trip device 599 which is used in place of trip device 550 in Fig. 11. As can be seen, trip device 599 may be directly substituted for trip device 550 by being connected to line 556. However, instead of being actuated by contact with a stop, dog 600 is shown within the body 601 of an electrical solenoid, so that actuation of the solenoid will cause dog 600 to move so as to unseat the ball within trip device 599.

The actuation of trip device 599 is performed electrically, instead of mechanically. Conductive leads 602, 603 are connected to the trip device, and lead 603 includes a battery 604, or other source of voltage, therein. A pattern 605 mounted to the worktable (not shown) has a stepped upper surface. It will be seen that when making a die with a stepped surface, a reversing device sensitive only to vertical elevation is not suitable, inasmuch as the device must turn around at different elevations, and a stop such as stop 555 would have to be continually readjusted.

The device of Fig. 13 overcomes this limitation. On a separate template or pattern, a conductive boundary 607 is placed around the relative location where the cavity is to be formed. This conductive line may be a wire insulated from the pattern, if desired, or it could comprise conductive paint painted over the surface of the pattern, except where the cavity is to be formed, or it could be such a simple expedient as a graphite pencil line drawn on an insulated surface of the pattern. Lead 602 is connected to the conductive boundary, while a stylus 606, which moves relative to the pattern the same as the cutting tool moves relative to the workpiece, and as the tracer valve moves relative to the other pattern, is conductive and is adapted to engage the surface of the pattern being traced. It will be seen that when the stylus is in contact with the conductive boundary, a circuit can close, providing current to actuate the solenoid to open the trip device, which opens conduit 556. Then the machine cycles just the same as though the dog were upset by a stop.

It is to be understood that not only will the device of Fig. 13 operate in the positive sense shown, that is, when a circuit is made by the contacts shown, but also could operate negatively, in the sense that a circuit which is normally closed, is broken when the stylus moves away from a conductive surface. Either way will work.

This completes the description of the mechanical elements of the control system and the machine tool which it directs. A description of the operation of the mechanism will now be given.

*Operation*

Air is turned on at pump 150 which through regulator 156 provides air to supply line 157, and through valve 160 and regulator 153 to supply line 155. In the drawings (see Fig. 2), master power valve 131, which has air from manifold 157a available at port 135, is shown turned off. In this condition of the valve, common port 133 is connected to vent 134 and this vents terminal 226 to atmospheric pressure. With terminal 226 vented, valve 160 is unactuated, and no pressure is supplied to line 163. Thus, there is no pressure to regulator 153, supply line 155, or off-on signal line 225. This means that there is no actuating pressure provided from signal line 225 to any of selector valves 93, 94, 102 or 103, and therefore no pressure can be supplied regardless of the position of the crossfeed and longitudinal feed handles to the directional pilot unit (valves 165–168). Also, because no pressure is provided to terminal 226, the automatic shut-down circuit is left unpowered. The device is entirely shut down.

To start up the device, the master power valve 131 is turned on by rotating shaft 132 so that a connection is made between supply line 157 through pressure port 135 to common port 133. Pressure goes to terminal 226 and flows from port 227 to port 231, and thence through line 232 to actuator 233 of valve 160. Then air from supply line 157 flows from port 159 to port 161, and through line 163 to regulator 153, thence through supply line 155 to signal conduit 225. Pressure is then on in signal conduit 225. Thus actuating pressure is available through the crossfeed and longitudinal feed controls 90 and 101, depending on their settings, and also pressure is applied to terminal 226. The machine can now be made to operate.

A single example of machine tool movement will be given of automatic operation with the feed movement on the longitudinal axis to the left (minus X movement) and pick movement on the crossfeed (Y axis) outward, that is minus Y movement.

In order to secure this arrangement, the automatic cycling disengage valve 141 will be placed on automatic (the drawings show it in manual position). Fluid under pressure then will flow from supply line 157 through pressure port 145 to common port 143 of valve 141 to line 261, thereby applying actuating pressure to actuators 260, 262 and 263. The conditions of valves 259, 264 and 265 will be the reverse from those shown, because in the drawings they are illustrated unactuated for manual machine control.

The selector valve 124 is left in the position illustrated. This connects common port 128 to vent 129 and vents conduit 275 which leaves deactuated the following actuators: 276, 277, 278, 279, 280. The valves controlled by these actuators, that is, valves 281, 282, 240, 283 and 284, respectively, all remain in the conditions shown in the drawings. The solid arrows show the valve condition corresponding to the illustrated actuator condition. The dotted arrows show the valve condition for the alternate actuator condition.

It will be appreciated that had it been desired to have feed movement on the cross feed axis and pick movement along the longitudinal axis, the reversal of the position of selector 124 would have put the same actuators under a pressure so that the condition of every one of the valves would have been reversed. It will be appreciated therefore that valves 281, 282, 240, 283 and 284 are a selector bank which determine which axis is to have the feed movement and which is to enjoy the pick movement.

To start the machine in the selected direction, the cross-feed control valve 90 will be turned so as to actuate valve 93 (changing the position of its blocks and leave valve 94 the way it is. The valve in the drawings is shown in the neutral position with neither valve actuated. This applies pressure from signal line 225 through port 217 to common port 216 of valve 93 and through orifice 208 into conduit 212. Pressure at terminal 196 actuates actuator 184 and also flows through check valve 200 where the conduit 192 between terminal 196 and trip device 204 is charged up to signal line pressure.

Actuation of valve 168 connects line 163 to common port 108 of valve 168 and thereby supplies pressure to conduit 322, which actuates actuators 359 and 360 of valves 342 and 345, respectively. This closes fluid communication between terminals 363 and 377 of valve 342 and terminals 382 and 384 of valve 345. Hydraulic pressure from feed supply conduit 55 is thereby passed by valve 342 to conduit 378. Conduit 378 crosses from Fig. 1 to Fig. 2 and flows to the left-hand side of Y axis motor 12. Exhaust fluid from motor 12 returns through conduit 381, which in the drawings returns to Fig. 1, and conduit 381 is connected into terminal 382 of valve 345 which is actuated along with valve 342. Returned fluid can therefore flow from terminal 382 to 384 and into manifold 385. The disposition of the exhaust fluid in manifold 385 will be described in a moment when the control on the X axis has been fully disclosed.

The feed movement will, because of the setting of valves 307 and 308 start out in the direction opposite from the last feed movement. Or, if this direction is the wrong way for the example, the longitudinal feed control handle 101 is manually turned to the right, thereby actuating valve 103 and leaving valve 102 in the unactuated condition illustrated. Actuating of valve 103 has caused fluid from line 225 to reach common port 213, from which it flows through orifice 205 in conduit 209 to terminal 193. This pressure flows through check valve 197 and charges up conduit 189 between terminal 193 and trip device 201. Pressure in conduit 185 actuates actuator 181 and pressure from line 163 is then supplied from port 169 to common port 177 of valve 165 to conduit 329.

Pressure in conduit 329 actuates actuators 353 and 354 of valves 336 and 337. Accordingly, pressure from supply line 55 is passed by valve 336 between ports 362 and 368 from which it flows to conduit 369. Conduit 369 passes (see Fig. 2) to the right-hand side of X axis motor 11. Exhaust fluid from motor 11 returns to inlet port 367 of valve 337 which is also actuated. This fluid is therefore passed through valve 337 to manifold 373.

It will now be seen that the exhaust from both the X and Y axis motors have been passed by the direction control unit to conduits 373 and 385. Inasmuch as the motors are hydraulic fluid motors, their rates of operation can be completely controlled by operation of downstream valving which exerts control over the flow of such exhaust fluid. In short, in accordance with common hydraulic practice, the motors are operated under full pressure with the control exerted on the exhaust side.

Manifolds 373 and 385 always hold the exhaust fluid, and what happens to this fluid determines the method of operation of the motors themselves.

At this point, the alternate operations of the cross-feed and the longitudinal feed control handles 90 and 101 may conveniently be explained. The above example has been given with respect to crossfeed out and longitudinal feed to the left. It will be understood that there are four combinations available, that is, any combination of right and left and in and out movement. Should movement "in" have been desired along plus Y axis, shaft 91 would have been turned so as to deactuate valve 93 and to actuate valve 94, in which case actuator 184 would have been deactuated and actuator 183 would have been actuated, thereby putting pressure on conduit 323 and actuating actuators 357 and 358, leaving actuators 359 and 360 deactuated. This would have passed hydraulic fluid between terminals 364 and 380 of valve 343 to conduit 381. Pressurized fluid in conduit 381 would have moved the table on the plus Y axis and fluid would have returned from Y axis motor through conduit 378 to port 379 of actuated valve 344, passing to port 383 of the same valve and to manifold 385.

Similarly, had longitudinal movement to the right been desired, valve 102 would have been actuated by turning handle 101, thereby leaving valve 103 deactuated. Deactuating valve 103 leaves actuator 181 deactuated, while actuating valve 102 provides pressure to actuate actuator 182 of valve 166. Valve 166 thereby supplies pressure to conduit 330, which actuates valves 335 and 338. Then valve 335 passes fluid between ports 361 and 365 to conduit 366. Conduit 366 operates X axis motor 11 to the right and fluid returns through conduit 369 to port 370 of valve 338 which is actuated. This passes the returned fluid to manifold 373. It will therefore be seen that the direction control unit simply acts as a selector means to determine whether the X and Y motors move the worktable to the right or left, and in every case the respective exhaust fluids are provided to manifolds 373 and 385.

In the example under discussion, the longitudinal (X axis) movement is to be feed movement, and the crossfeed (Y axis) movement is to be pick movement. This arrangement was provided for when the selector 124 deactuated actuator 279 of valve 283, for then fluid from supply line 157 will have passed through actuated valve 160 to line 163 and through actuated valve 265 when selector 141 is turned to "auto" to conduit 273 and thence through unactuated valve 283 to conduit 400. Pressurized fluid in conduit 400 (see Fig. 1) actuates actuator 406 of valve 339 and actuator 405 of valve 348.

When valve 339 is actuated, then fluid from manifold 373 is passed between ports 374 and 374a to conduit 46. Conduit 46 passes through sector 39 of tracer valve 17. It is sector 39 which regulates the feed movement of a motor controlled by it. Fluid exhausted from sector 39 flows out conduit 47 to reservoir. It will be seen that this adjustment therefore establishes the X axis movement as "feed movement." It will be observed that valves 340 and 341 are not actuated. The appropriate conduits controlling them at this time are conduits 401 and 272. Conduit 401 is vented by unactuated valve 284, and conduit 272 is vented by actuated valve 264.

With actuator 405 of valve 348 actuated, fluid from manifold 385 flows from port 388 to port 391 and into exhaust conduit 367b. Conduit 376b discharges into the feed rate valve 106 and out of that valve to reservoir. The construction of valve 106 has been discussed above, and it will be appreciated that the rate at which the fluid can flow through the Y axis motor is governed by valve 106. Flow out of valve 106 is controlled by actuator 254a. It will be seen that actuator 254a controls valve 254b, which, when the actuator is unactuated, permits the flow of fluid through valve 106. Therefore, the prerequisite of pick movement in that actuator 254a be unactuated. This will be discussed in greater detail below.

Had it been desired to reverse the above situation and have the Y axis movement to be the feed movement and the X axis movement to be the pick movement, selector 124 would have been reversed, thereby reversing the condition of valves 281, 282, 240, 283 and 284. In particular, this would have reversed the condition of valves 283 and 284 which are the selector valves which pertain to this problem in this case. Had reversal occurred, then actuators 405 and 406 would have been unactuated because of no pressure in conduit 400, and actuators 404 and 407 would have been actuated, thereby passing fluid from manifold 385 to conduit 46 placing the Y axis under feed control movement and discharging manifold 373 through valve 341 to conduit 376b and the feed rate valve 106. This is, of course, a reversal of the position being discussed in detail.

Also, it may be pointed out that it might not be desired to have either axis under feed or pick movement, but instead to utilize the circuit as a conventional mill. Then it is desirable to actuate actuators 402 and 403. It will be observed that these are both connected to conduit 272, and that conduit 272 will be under pressure when actuator 262 of valve 264 is unactuated. Actuator 262 is unactuated when selector 141 is positioned as shown in the drawings, with conduit 261 vented. This vents actuators 260, 262 and 263. All power will have been cut off to valves 283 and 284 because valve 265 is vented to its vent 270. Therefore, there can be no pressure in conduits 400 and 401 so that valves 339, 341, 346 and 348 are closed. Therefore, with pressure on in conduit 272, valves 340 and 347 are open to flow, and fluid from both manifolds 373 and 385 is dumped into exhaust conduit 376b. This exhaust conduit dumps through the feed rate control valve 106 which may be opened as wide as desired, and fluid from there flows directly to exhaust. At the same time, actuator 254a remains unactuated because actuator 260 is vented at valve 141, so that fluid can flow through valve 106. This describes the conventional powered movement of the device. The direction of movement is selected by valves 90 and 101.

To this point it has been described how the direction control unit and the circuit selector unit determine the direction the worktable is to move and the manner of movement along each of the axes. The automatic features of this circuit will now be more fully discussed. Returning to the initial example of X axis feed movement to the left and pick movement outward, it will now be seen that there is pressure in conduits 329 annd 322.

The operation of valves 303 and 304 will now be described. These valves are of the "flip-flop" type. They are pre-positioned at each reversal to transmit power to actuators 96, 97, 104 or 105 for the next reversal. For example, when pressure is on in actuator 305 (of valve 307), connection will be made as indicated by arrow 500 (the lower arrow), and when actuator 306 is actuated, the connection is made as shown by upper arrow 501. The same is true of actuators 311 and 312, which when actuated, cause the connection to be made as shown by lower and upper arrows, 502, 503, respectively. Valves 307 and 313 are detent types, and retain these settings. They transfer from one setting to the other at about 50–60 p.s.i.g., a pressure higher than the transfer pressure of actuator 297 in valve 293, for reasons to be disclosed.

It will first be assumed that the carriage is moving to the left, and that it is to be automatically reversed at the end of a feed movement stroke to move to the right.

Pressure is on in conduit 329, actuator 311 has transferred the connection in valve 313 to the condition illustrated by arrow 502, and pressure is transmitted through shuttle 326 to conduit 328. Valve 103 is actuated; valve 102 is unactuated. Under these conditions, the machine will run to the left until trip device 201 is struck. Then the machine is to reverse and run to the right, after having taken one pick feed step.

For this purpose, actuator 105 will have to be actuated to strike the handle of valve 101 so as to actuate selector valve 102 and deactuate valve 103. Air can flow to actuator 105 from conduit 430 via the connection illustrated by arrow 502, the valve condition assumed when the table started to move to the left on the last reversal.

Pressure in conduit 430 occurs when actuator 276 (see Fig. 2) of valve 281 is unactuated as a result of selector 124 having been set at longitudinal feed condition, that is, by venting the same, and this condition must be concurrent with an unactuated condition of actuator 297 of valve 293. The unactuated condition of actuator 297 will result when the time line comprising conduits 301 and 302 is discharged.

Power to valve 293, which is ultimately transmitted to conduit 430 is brought from conduit 273, which conduit 273 receives power from supply line 163 when valve 265 is actuated by setting valve 141 on the automatic position. It will therefore be noted that pressure will arrive at valve 304 to be transmitted to actuator 105 only when the timer line comprising conduits 301 and 302 is discharged. It must now be determined how this timer line becomes discharged.

It will be observed that the time line conduits terminate at terminals 298 and 299, and that because check valve 300 is placed between these two terminals, the only exit of air from the timer line is through conduit 294. Conduit 294 is connected by valve 282 to conduit 328 when actuator 277 is unactuated as shown. Conduit 328 (see Fig. 1) passes to port 327 of shuttle 326 and is under pressure by virtue of its connection through that shuttle valve with conduit 329 which is under pressure when the machine moves to the right. Conduit 329 in turn, is under pressure because actuator 181 of valve 165 is energized by virtue of actuation of valve 103. This actuation has resulted in the charging up of conduit 189 with air, and this air is held because trip device 201 is closed. As soon as the machine has gone as far as desired to the left, the dog of trip device 201 unseats the ball of the device, and permits air to escape from conduit 189 faster than orifice 205 will permit it to be restored. This leakage permits the air to discharge from actuator 181 and the valve 165 becomes de-energized, thereby venting conduit 329, which in turn vents conduit 328, which in turn through valve 282 vents conduit 294 and the timer line. This drop in the pressure in the timer line then enables the actuator 297 of valve 293 to become deactuated which passes pressure from conduit 273 to conduit 291. This in turn provides fluid to conduit 430 which provides a flow to port 314 of valve 304. Then, fluid from port 314 flows through conduit 334 and enters actuator 105 which knocks the handle of valve 101 to the left so as to deactuate selector valve 103 and actuate valve 102. This action causes valve 103 to vent conduits 185 and 189, and this removes the pressure from conduit 329.

The said action also cuts off the source of air from conduit 273 as soon as timer valve 293 reactuates. The various actuators 96, 97, 104 and 105 have within them a small bleed orifice which provides means for venting the air which was supplied to actuate the actuator after the selector position has been changed. It will be understood that other means of venting the actuators could comprise a valving means in the "flip-flop" arrangement whereby the air would be vented from these actuators when the "flip-flop" valve switched over. The natural leakage in an actuator having rather loose tolerances would also allow this leakage. At any rate, actuators 96, 97, 104 and 105 are bled down after they have applied their momentary burst of power to flip the handles of selectors 90 or 101 to the next position.

This momentary power exerted by the actuators is a preferred feature of the invention because it leaves the extended handles free to be moved by the operator at any time for the purpose of reversing the direction of feed at will, without reference to the machine stops, which might be incorrectly set. Also, it permits the operator to locally mill detailed areas without setting the stops at all. He may perform these operations, still retaining the automatic pick movement action by placing the handle in neutral when he desires to stop his longitudinal feed. This has the same effect as tripping the appropriate trip mechanisms 201–204, as it removes air from the respective actuator.

Attention in this respect is called to check valves 197–200. It will be observed that in order for actuators 181–184 to become deactuated, that the air in the respective conduits 185–188 and 209–212 must be discharged. The volume of these conduits may be kept relatively small, while the conduits 189–192 which are connected thereto must run all the way out to the trip devices and may comprise a significantly large volume. If the pressure in lines 189–192 had to be discharged during the reversal operation, then a sloppy movement might well result. For this reason, the check valves 197–200 are provided which prevent reverse flow from conduits 189–192, thereby limiting the volume from which pressure must be discharged to that contained in conduits 185–188 and 209–212.

At this point, attention may also be called to another usefulness of valve 106. When the device is utilized manually, it may be desired to shift the machine rapidly so as to provide a quick traverse movement. For this purpose, it is only necessary to select the direction in which traverse is desired, and then to open valve 106 wide by pressing on handle 118 to permit the maximum rate of fluid flow therethrough.

The next thing that occurs is that when valve 102 is actuated by the handle, pressure is provided to conduits 186 and 190, thereby actuating actuator 182. This places pressure in conduit 330 which actuates valves 335 and 356, which as stated above, starts the carriage moving to the right. At the same time, pressure is supplied by conduit 330 to actuator 312 of valve 304 which reverses the position of the valve to that shown by arrow 503, and air is also supplied to port 325 of shuttle 326, this air flowing through conduit 328 (see Fig. 2), which pressure flowing through valve 282 charges up the timer line by applying pressure at terminals 298 and 299. This pressure actuates actuator 297 and cuts off valve 293, thereby cutting off pressure flow to valve 281, which in turn cuts off flow to the actuators until the pressure drops in the timer lines again. When this occurs, it will be by virtue of trip device 202 having been opened to discharge conduits 186 and 190, thereby deactuating actuator 182 and providing a vent to atmosphere through vent 174 which discharges conduit 330 and through this vent discharges the timer line. At the same time this will deactuate actuator 297 of valve 293, and then fluid under pressure is directed to conduit 430 which provides pressure at port 314. Pressure from port 314 is transmitted by the last setting of valve 304 to actuator 104 which kicks over the handle of valve 101 to reverse the same and cause the device to move to the left as before. It will therefore be seen that this is an automatic reversal of the longitudinal axis movement which occurs by virtue of discharging the timer line out the vents 170 and 174 of valves 165 and 166, respectively. The same sort of action would occur were feed movement to be desired along the crossfeed, because then the "flip-flop" switch 303 would receive pressure from conduit 431 the same as conduit 430 received it because actuator 276 would be actuated by changing the selector position to crossfeed, and therefore pressure from conduit 291 would be fed to port 287 of valve 281 so that the "flip-flop" valve 303 would receive pressure from conduit 291 instead of valve 304.

From the above description, it will be evident that the cycling reversal of feed movement caused by this control is primarily attained by setting the positions of the valves in the direction control unit. This is done by suitable adjustment of valves 90 and 101, by means of which the direction of crossfeed and longitudinal feed may be selected. The selection is made by selector 125 as to whether the longitudinal or the cross motion will be feed or pick movement. Once valves 90, 101 and 125 are set, one of the trip devices 201–204 becomes the primary controller that establishes the limit of movement in the respective direction, and starts the control system on its transfer to another condition wherein the table movement is reversed.

The circuit settings shown in Figs. 11 and 12 illustrate the situation which exists while the worktable moves to the left, with the longitudinal movement acting as feed movement and the crossfeed acting as pick movement. The circuit operation will particularly describe reversal of table movement, so that the table moves to the right.

So long as a positive elevated pressure is provided in one of conduits 185–188, a respective one of actuators 181–184 is actuated, and control fluid is transmitted to an appropriate block of valves in the direction control unit, thereby directing hydraulic fluid to an appropriate side of one of the fluid motors to cause the desired motion. As has been said before, reversal of table movement is caused by opening of the respective trip device, so that air is discharged from a respective one of conduits 185–188. In the example to be discussed, air is to be discharged from conduit 185 by opening trip device 201 so as to deactuate actuator 181. The dumping of the air in an appropriate one of conduits 185–188 (in the example conduit 185) is all that is needed to initiate the reversal of the machine along the axis selected for feed. Accordingly, should reversal of movement be desired from another source, such as from trip device 550, it is only necessary for provision to be made to discharge air from the selected one of conduits 185–188 which would have caused reversal of the table had the respective one of trip devices 201–204 been opened. It now remains to be shown how in one selected adjustment, reversal of feed movement will result from opening of the trip device 550. Reversal of the other movements can be deduced from the single example.

In Fig. 1, valve 103 is actuated to arrange the table movement to the left. Valve 124 is set for longitudinal feed and cross pick. Then port 128 will be connected to vent 129. This vented condition vents junctions 598 (see Figs. 2 and 11) and junction 588 (see Figs. 2 and 11). The result of this is to deactuate actuators 586 and 595, thereby setting valves 580 and 589 in the conditions shown.

With valve 101 set so that valve 103 is actuated, signal pressure from conduit 225 flows through conduit 579 to terminal 193. Terminal 193 is shown in both Figs. 1 and 11. As has been outlined above, pressure at terminal 193 results in actuation of actuator 181 and the setting of the direction control units so that hydraulic fluid is passed to motor 11 to move the machine's table to the left. Pressure from terminal 193 enters conduit 189 and presses against trip device 201, and also flows through conduit 585 through valve 580 (from port 583 to port 581) to junction 577. Pressure from junction 577 enters conduit 575, passes through orifice 576, and reaches junction 570 where it energizes actuator 571 so as to switch over this normally closed block valve to interconnect ports 573 and 574. Pressure from junction 570, and from port 573 when valve 572 is open, goes to shuttle valve 558, passes through orifice 577, and reaches trip device 550.

It will now be seen that pressure is "on" at trip device 550, and is directly connected to junction 193 through valves 580 and 572 just the same as trip device 201. Therefore, opening either trip device 201 or 550 will cause the machine's horizontal movement to be reversed, and the same reversal will take place if trip device 550 is opened as if trip device 201 is opened. It is, therefore, not necessary to discuss the reversal of the machinery any further, because reference may be had to the above description of the operation in connection with trip device 201 for that purpose. Now if dog 554 engages stop 555, air will be discharged from port 551, which drains conduit 585, thereby reducing pressure at terminal 193, deactuating actuator 181 and causing the control system to transfer so as to reverse the direction of table movement.

The transfer action includes an impulse from actuator 105 which pushes the handle 101 so that valve 102 passes pressure to terminal 194. As can be seen in Fig. 1, terminal 194 is associated with trip device 202, this trip device being the one which stops the movement of the machine to the right and causes transfer of the control system so that the table will move again to the left. In movement to the right, selector valve 589 passes pressure from conduit 594 to junction 568, which pressure causes the same reactions on valve 563 as pressure from terminal 193 caused on valve 572. In this case, pressure in conduit 559 moves shuttle 558 the other way, thereby still applying pressure in conduit 556. The purpose of shuttle 558 is simply to isolate conduits 559 and 560 from each other, but still permitting either one to discharge pressure into conduit 556.

The purpose of valves 580 and 589 is to choose which of junctions 193 and 195 or 194 and 196 will be connected to the additional trip device. Which of the selected junctions is active is determined by the setting of valves 90 and 101. For example, in the example given, junctions 193 and 194 are connected to valves 563 and 573. Junction 193 has pressure because valve 103 is actuated. Junction 194 has no pressure, because when valve 103 is actuated, valve 102 is not. Were the settings of valves 580 and 589 reversed by actuating their actuators, junctions 195 and 196, would be the selected junctions, and pressures at these junctions are effective for reversing movement when the cross-movement is feed instead of pick.

There are certain design considerations in connection with certain elements of the circuit of Fig. 11. Fig. 12 is particularly provided for disclosing these considerations. Fig. 12 illustrates valve 103. Conduit 579 is shown connected to common port 213 of valve 103. Conduit 579 includes orifice 205, which discharges into conduit 209, and connects to junction 193 through conduit 209. Fig. 12 illustrates the connection of conduit 185 to terminal 193, and to valve 165. This valve controls the admission of signal pressure to conduit 329, which sets the directional control unit for establishing movement of the worktable to the left. Between conduit 209 and line 560 there is shown orifice 576, and between lines 560 and 556 there is shown orifice 557. The two ports of valve 572 are shown connected between terminal 193 and conduit 560, while the actuator of valve 572 is shown connected to conduit 560. Conduit 556 is shown connected to trip device 550. The pressure relationships which take place in the circuit of Fig. 11 can best be understood from Fig. 12.

In the circuit condition shown in Fig. 11, pressure is "on" at terminal 193 and trip device 550 is closed. Accordingly, pressure in all parts of the circuit will rise to the same level. This can best be understood by referring to Fig. 12. Conduits 579, 209, 560, and 556 will have the same pressure because when the conduits are filled, there is no air flow, and the pressure will tend to rise to the value of the source despite the presence of the orifices. Assume that the signal pressure from line 225 is 30 p.s.i.g. Then all of these conduits will be 30 p.s.i.g. (all pressures in this specification are gauge pressures). Valve 572 will be opened because actuator 571 is actuated, and valve 165 will be in the condition shown, passing signal pressure to conduit 329.

Now assume that the table moves vertically far enough that the dog of trip device 550 strikes stop 555 and unseats the ball. Then, air can flow through the system as shown, and the pressure drops across the orifices establish different pressures in the various conduits. The dimensions of the orifices are selected so that this occurs, and for that purpose, the following orifice dimensions have been found convenient:

| Orifice: | Inch |
| --- | --- |
| 205 | 0.025 |
| 576 | 0.020 |
| 557 | 0.040 |

When the bleed opens, it will be noted that the actuator 571 will still remain actuated. In fact, it is selected so that it requires between 18–20 p.s.i.g. for actuation, and it will remain in the actuated condition until the pressure to which it is exposed drops to less than 5 p.s.i.g. Therefore, for valve 572 to be closed, the pressure in conduit 560 must drop below 5 p.s.i.g. Now with valve 572 still open, it provides a bypass across orifice 576 so that pressure at terminal 193 and in conduit 560 are about the same. Pressure in conduit 556 will drop to about 2 p.s.i.g., because it is directly vented to the atmosphere, and pressure in conduit 579 will be about 30 p.s.i.g. Pressures in conduits 209 and 560 will be about 10 p.s.i.g.

Actuators 181–184 are set so that they actuate at 19 p.s.i.g. or over, and deactuate at 11 p.s.i.g. or less. Between 11 and 19 p.s.i.g., the actuator retains its last condition. Actuators 562 and 571 actuate at 18–20 p.s.i.g. or over, and deactuate at 5 p.s.i.g. or less.

When the trip device opens, the following pressures are established: Conduit 579, 30 p.s.i.g.; junction 193 (conduit 209) and conduit 560, about 10 p.s.i.g. (less than 11 p.s.i.g. and more than 5 p.s.i.g.), and conduit 556, about 2 p.s.i.g. Note that conduits 209 and 560 are at the same pressure, because valve 572 is open, the pressure thereby established being greater than the minimum required to deactuate actuator 571. However, this pressure is below 11 p.s.i.g., and actuator 181 is deactuated, thereby switching over valve 165 and starting the transfer of the circuit so as to reverse the machine.

The first effect of the switchover of valve 165 is, of course, to stop the leftward table movement. Therefore the table stops, and trip device 550 is held open.

After the circuit transfers, pick movement occurs, and actuator 105 changes the position of selector 101, so that valve 102 is actuated, and valve 103 is deactuated. Deactuation of valve 103 connects conduit 579 to vent 224. This vents conduits 579, 209, and 560. Conduit 556 is vented to atmosphere by the trip device, which will remain open until the table actually begins to move to the right. The said conduits are now all at about zero p.s.i.g., and actuator 571 is deactuated, which closes valve 572.

As the table moves to the right, trip device 550 closes. Because selector 101 transferred to actuate valve 102, pressure is provided to port 214, and thence to terminal 194, from which it flows through shuttle 558 to conduit 556. Shuttle 558 isolates conduit 560 from this surge of pressure. The branch of the circuit from shuttle 558 through conduit 560 and back to terminal 193 is now vented, and awaits its next surge of pressure, which occurs when selector 101 next actuates valve 103 to start the table to the left after the desired movement to the right.

When the desired movement to the right has just been completed, trip device 550 will be open, valve 572 will be closed, and conduit 560 will be at zero p.s.i.g. Then selector 101 switches over, actuating valve 103, so that pressure again is supplied to terminal 193. Again referring to Fig. 12 for explanation purposes, but this time having the starting conditions with trip device 550 in the open position and valve 103 just being actuated, and the table is just starting to move to the left. This would be a typical condition when the stylus is tracing a cavity and the vertical trip device 550 is operated at the vertical wall on each side of the cavity, and the motion of left and right reversed only by this signal. With this starting condition, the pressure distribution is as follows: Conduit 579, 30 p.s.i.g.; conduit 209, in excess of 20 p.s.i.g.; conduit 550, less than 18 p.s.i.g.; and conduit 556, about 2 p.s.i.g. Actuator 571 will not actuate, and valve 572 remains closed. Pressure in conduit 209 remains higher than in conduit 560, because all air must flow through orifice 576. This holds pressure in conduit 209 high enough to actuate actuator 181, actuating valve 165, and the machine table will move. When it does move, trip device 550 is closed, and pressure builds up to 30 p.s.i.g. in the conduits, actuating actuator 571, and the circuit will now operate as described before when the stop 555 is again contacted.

From the above, it will be seen that valves 563 and 572 act as a by-pass over orifices 567 and 576, respectively. When valve 572 is closed, orifice 576 is in the sole flow stream, and a relatively higher pressure can be developed in conduit 209 than when the valve is opened and orifice 576 is by-passed. The same action occurs in valve 563 as in valve 572.

The operation of the device in Fig. 13 is evident from the drawings. Stylus 606 moves relative to the template in the same manner that the tracer valve stylus moves relative with the pattern and the cutting tool relative to the workpiece, so that when this stylus makes contact with the conductive (or if a negative circuit is used, the non-conductive) portion of the pattern, a circuit is completed which actuates the solenoid in trip device 599 to open the same. The action relative to the pneumatic circuit is the same as though the trip device were mechanically upset, and no further description of that is believed necessary.

The above accounts for feed movement along either of the axes. The pick movement will now be described.

It will be noted that in the above description of reversing movement, only one pair of trip devices, on the same axis, were involved. This is because pick movement occurs only in one direction, stepwise, and is not a reversing movement. It will be recognized that pick movement should occur only when longitudinal movement has stopped at the end of its stroke and that it is preferable for longitudinal movement to be entirely stopped when the pick movement occurs. Whichever axis is on pick movement, exhaust pressure is provided through conduit 376b to valve 106 (see Fig. 2). Actuator 254a will be maintained under pressure while actuator 260 is energized by the automatic setting of selector 141 (reverse of setting of valve 141 from that shown in Fig. 2), and whenever there is pressure in either of conduits 291 or 294, the conditions being concurrent. Conduit 294 will be pressurized whenever there is pressure on in any of conduits 322, 323, 329 and 330, because conduits 322 and 323 feed into conduit 321 through shuttle 319, while conduits 329 and 330 feed into conduit 328 through shuttle 326. Then pressure is passed by selector 282 to conduit 294, and there will therefore be pressure passed through shuttle 256 into conduit 255 and thereby to actuator 254a. Therefore, whenever there is pressure on in any of the four conduits 322, 323, 329 and 330 which at the setting of the valves is causing feed movement to occur, actuator 254a is actuated and fluid cannot flow through valve 106. Valve 282 "locks out" pick movement pressure from the timer line and thereby from actuator 254a. It will also be observed that conduit 255 can receive pressure from conduit 291, which occurs whenever actuator 297 is unactuated as shown, and that this occurs at the end of the stroke when the timer line is discharged.

At first glance, it would appear that this takes in the entire cycle, and that conduits 254 and 255 could not ever become discharged. However, there is a design feature herein which permits these to discharge at an appropriate moment. It is as follows: the snap-action valve 293 transfers at about a pressure of 10 to 15 p.s.i. on actuator 297, as does actuator 254a. However, in order for actuator 297 in valve 293 to become deactuated, fluid must discharge from the comparatively large volume in conduits 301 and 302 entirely through conduit 294. This takes an appreciable period of time, because check valve 300 requires the flow to be from terminal 298 through conduits 301 and 302 to terminal 299 in that order. Until pressure falls to this level, pressure will be off in conduit 291, because actuator 297 was actuated. Pressure will continue to drop at terminal 299 as air flows out of conduit 294, and therefore it also falls in conduits 254 and 255. Finally the transfer pressure (10–15 p.s.i.g.) of actuator 254a is reached, and valve 119 is opened to flow. This pressure will be reached in conduits 254 and 255 before it is in conduits 301 and 302 (which control actuator 297), because of the greater volume in lines 301 and 302, and because the restriction in valve 121 retards the fall of pressure in conduit 301. Therefore, actuator 254a becomes deactuated before actuator 297. Thereafter, actuator 297 becomes deactuated. This connects conduits 291 and 273 through valve 293, and pressure is again supplied to conduits 254 and 255, this time through shuttle 256 from conduit 291. Pick feed is therefore stopped by actuation of actuator 254a, which closes valve 119. The time which valve 106 is open for flow is determined by the length of time which it takes for discharge from terminal 299 out conduit 294 to take place before actuator 297 snaps over. The feed rate valve 106 is opened for a predetermined period of time each time that fluid is discharged from conduit 294. The length of this time is adjusted by valve 121, which determines how fast the pressure may exhaust from conduit 301 into conduit 302. The combination of rate control by valve 106 and time control by valve 121 determines the distance stepped for each pick movement. Cutting down either tends to shorten the step.

Which way the pick movement occurs when the pick is on crossfeed is determined by whether the handle 90 is set to the right or to the left. It is frequently desired to have this machine go back and forth and step over incrementally a number of times and then to shut off when the job is completed. It will be understood that a job will be completed as soon as the device has reversed back and forth across the work repeatedly until the pick feed has stepped the table for the full width of the work. Means are therefore provided for automatically shutting down the machine as soon as a trip device on the longitudinal movement and a trip device on the crossfeed movement are simultaneously engaged. Incidentally, when the device is used manually, automatic shut-down occurs when a trip device on the pick movement axis is engaged.

When the automatic shutdown is disengaged as shown in Fig. 2, conduit 239 to selector 228 is vented and actuator 238 is deactuated such that pressure fluid from off-on switch 131 flows to terminal 226 and thence through conduit 232 to actuate the master switch 160. In the event that the device is desired to operate so as to shut down automatically, automatic shutdown switch 136 is turned to its engaged position (it is illustrated in the disengaged position), so that the pneumatic pressure is applied through conduit 239 to actuator 238. This interconnects ports 231 and 234 in valve 228. Actuator 243 of valve 230 will be actuated so valve 230 transmits power from terminal 226 to conduit 235, through valve 228, and to conduit 232 so as to actuate the master switch when there is pressure in conduit 242. This pressure occurs whenever valve 240 is connected through shuttle 319 or 326 to the conduit 322, 323, 329, or 330, which controls pick feed movement. For example, in the example given where pick feed is on the crossfeed movement, there is pressure in conduit 321 because there is pressure in conduit 322. This pressure flows from port 432 to port 241 and so long as the trip device 204 remains undisturbed, pressure will be on in this line because valve 168 is actuated. However, as soon as trip device 204 is opened and valve 168 is closed, then pressure drops in conduits 322 and 321 and this vents conduit 242, thereby deactuating actuator 243 and cutting off pressure to conduit 235. In turn, this de-energizes actuator 233 and cuts off all pneumatic power to conduit 163. The selectors 90 and 101 can be moved and their controlled elements can be pre-set, but without power from conduit 163, there will be no machine movement, because no valves in the direction control unit are actuated. Thus power to move the machine tool elements is shut off. Pressure switch 274 cuts off electric power to the machine tool elements, such as spindles and the like. It will be observed that this result would have occurred whichever way the crossfeed was going on pick feed, and that the same result would have been attained by dumping pressure from conduit 328 had pick feed been on the longitudinal movement and actuator 278 been actuated for that purpose.

It is believed that any combination of machine tool movements within the capacity of this machine may be deduced from the above examples.

*Résumé*

Certain features of this invention may now be understood in their full importance. Particular attention is called to the hydraulic supply system, particularly the use of a single pump 49 in combination with two supply lines 51 and 55 in combination with orifice 52. Orifice 52 is provided for the purpose of permitting a different operating pressure to be chosen if desired, for each line under control of the tracer valve. In this manner the feed rates of each valve can be balanced, even though the motors do not require the same pressure for operation, for example, because the force required for moving them might not be balanced. The circuit connected as shown presupposes that the table circuit requires a basically higher pressure for its operation than the knee. By this arrangement, the orifice limits the flow from the circuit of higher pressure to that of the lower pressure according to the pressure differences between these two circuits and the area of the orifice. The sizing of this area provides a base division of the total pump output through the two systems that always provide more capacity to each of the valve circuits than the maximum valve opening can pass. This results in both circuits operating independently and without relation as to pressure required to move either element.

Another important feature of the invention resides in the banks of selector valves 335–338, and 342–345. These banks of four light-weight, inexpensive, pneumatically operated valves perform the same duty as a single, expensive hydraulic four-way valve. The reduction of cost and complexity attained by these valves, as compared with conventional hydraulic valves, is striking.

The device shown in the drawings and described in the description provides a completely automatic machine tool which is capable of being operated either as a conventionally powered milling machine or as a completely automatic contour copying machine, which is so automatic that it may simply be turned on and will turn itself off when the desired work is achieved. Furthermore, means are provided for shortening the feed stroke by an automatic turnaround feature effective at the ends of the working stroke. It will be appreciated that one trip device in a horizontal axis could be used with one vertical stop to control reversal for milling along one shoulder, or two vertical trip devices could be connected to conduit 556, one effective at an upper and one effective at a lower level, so as to machine a particular level on a shoulder, or, as shown before, the single vertical trip device can be used alone, so as to reverse the table movement at both edges of a cavity so as to confine the milling action to a cavity area. The circuit operation of the device beyond the trip devices is the same in all cases.

For convenience in disclosure, certain elements, and groups of elements, are referred to interchangeably as follows:

Axis-selector means: Valves 580 and 589.

Control element for selectively controlling connection of motors to power source: Valves 165–168, their actuators 181–184, conduits conveying pressure to these actuators, and trip devices 201–204.

Reversal means: The circuit of Fig. 11.

Pressure-responsive valve in the control elements: Valves 165–168, and the directional control unit (Fig. 1).

Block valves: Valves 563 and 572.

This invention is not to be limited by the embodiments shown in the drawings and described in the description, which are given by way of example and not of limitation, but only in accordance with the scope of the appended claims.

I claim:

1. A control for a machine tool of the type which has a member reciprocably movable along a pair of angularly related axes, a first and a second motor providing power for moving said member along a respective first and second of said axes, and a source of power for said motors, said control comprising: a control element for the first motor which is adapted to selectively control the connection of said motor to said source of power so as to determine the direction the motor is to move the member, said control element comprising a pair of conduits, means for selectively placing said conduits under fluid pressure one at a time, a pressure-responsive valve with an actuator, there being one of said pressure-responsive valves and actuators for each conduit, the actuator being connected to the conduit, so that power is passed to the motor when the actuator of a selected one of said pressure-responsive valves is actuated by pressure in its respective conduit, a first-axis trip device in each of said conduits, which trip devices are so disposed and arranged as to open and discharge fluid from their respective conduits when the member reaches a pre-selected position along said first axis, and thereby deactuate the respective pressure-responsive valve so as to stop movement of the member in the respective direction; and reversal means disposed on the second axis and responsive to the position of the member on the second axis for reversing the condition of the control element so as to reverse the direction of movement of the member along the first axis when the member reaches a preselected position along said second axis, said reversal means comprising a second-axis trip device adapted to be opened when a pre-selected position along the second axis is reached, a pair of block valves, each of which has an actuator and a pair of ports which are connected when the actuator is actuated, the actuator and a first of said ports of both block valves being connected to said second-axis trip device, the actuator and second port of the individual block valves being connected to a different one of said conduits, whereby the second axis trip device has a like effect on the pressure-responsive valves as their respective first axis trip devices, thereby providing for reversal of movement along the first axis as a function of member position along the second axis.

2. A control according to claim 1 in which a shuttle is provided which has a common port and two other ports, the common port being connected to the second-axis trip device, and the other ports being individually connected to the first port and actuator of the block valves, the block valves thereby being connected to the second-axis trip device through the shuttle.

3. A combination according to claim 2 in which the means for selectively placing said conduits under fluid pressure includes a source of fluid pressure, and selector valve means in each of said conduits whereby said conduits may be selectively pressurized or vented, but not pressurized simultaneously, a first orifice in each of said conduits through which the pressurized fluid must flow from the selector valve means to reach the first axis trip device, pressure-responsive valve, and block valve, and in which a second orifice is placed in the connection between the actuator of each pressure-responsive valve and the connection between the first port and actuator of the respective block valve, the second ports of the block valves by-passing the second orifices through the block valves when the block valves are opened, and in which a third orifice is placed in the connection between the common port of the shuttle and the second-axis trip device.

4. A control according to claim 3 in which the actuator of the pressure-responsive valve actuates at a first pressure and deactuates at a second pressure, and in which the actuator of the block valves actuates at a third pressure and deactuates at a fourth pressure, the first and third pressures being approximately equal, the second and fourth pressures being less than the first and third pressures, and the fourth pressure being less than the second pressure.

5. A control according to claim 4 in which the sizes of the orifices are selected so that when a respective conduit which is charged with fluid is opened by the second-axis trip device, and the pressure on the actuator of the respective block valve is maintained at a value above the fourth pressure by virtue of the previous actuation of the block valve, which actuation interconnected the first and second ports of the block valve, the pressure not dropping below the fourth pressure until the respective conduit is vented by its selector valve means.

6. A control for a machine tool of the type which has a member reciprocably movable along three mutually perpendicular axes, first, second, and third motors providing power for moving said member along a respective first, second, and third of said axes, and a source of power for said motors, said control comprising: a control element for each of the first and second motors which is adapted to selectively control the connection of its respective motor to said source of power so as to determine the direction its respective motor is to move the member; reversal means disposed on the third axis and responsive to the position of the member on the third axis for reversing the condition of a selected one of said control elements so as to reverse the direction of movement of the member along the axis respective to the selected one of the control elements when the member reaches a pre-selected position along the third axis; and axis-selector means for selecting the control means upon which the reversal means is to be effective.

7. A control according to claim 6 in which each of the control elements comprises a pair of conduits for each axis, means for selectively placing said conduits under fluid pressure one at a time, a pressure-responsive valve with an actuator, there being one of said pressure-responsive valves and actuators for each conduit, the actuator being connected to the conduit, so that power is passed to the respective motor when the actuator of a selected one of said pressure-responsive valves is actuated by pressure in its respective conduit, a first-axis trip device in each of the conduits respective to first-axis movements, and a second-axis trip device in each of the conduits respective to second-axis movements, which trip devices are so disposed and arranged as to open and discharge fluid from their respective conduits when the member reaches a pre-selected position along the respective axes, and thereby deactuate the respective pressure-responsive valve so as to stop movement of the member in the respective direction; and in which said reversal means comprises a third-axis trip device adapted to be opened when the pre-selected position along the third axis is reached, a pair of block valves, each of which has an actuator and a pair of ports which are connected when the actuator is actuated, the actuator and a first of said ports of both block valves being connected to said second-axis trip device, the actuator and second port of the individual block valves being connected to a different one of said conduits, whereby the third-axis trip device has a like effect on the pressure-responsive valves as their respective first and second axis trip devices, thereby providing for reversal of movement along the first and second axes as a function of member position along the third axis; and in which the means for selecting the control means upon which the reversal means is to be effective comprises a pair of two-position valves adapted to connect the conduits respective to first and second axis movement individually to the block valves, so that both first-axis conduits or both second-axis conduits are simultaneously so connected.

8. A control according to claim 7 in which a shuttle is provided which has a common port and two other ports, the common port being connected to the second-axis trip device, and the other ports being individually connected to the first port and actuator of the block valves, the block valves thereby being connected to the second-axis trip device through the shuttle.

9. A control according to claim 8 in which the means for selectively placing said conduits under fluid pressure includes a source of fluid pressure, and selector valve means in each of said conduits whereby the conduits respective to movement in a given axis may be selectively pressurized or vented, but not pressurized simultaneously, a first orifice in each of said conduits through which the pressurized fluid must flow from the selector valve means to reach its respective first or second axis trip device, pressure-responsive valve, and block valve, and in which a second orifice is placed in the connection between the actuator of each pressure-responsive valve and the connection between the first port and actuator of the respective block valve, the second ports of the block valves by-passing the second orifices through the block valves when the block valves are opened, and in which a third orifice is placed in the connection between the common port of the shuttle and the second-axis trip device.

10. A control according to claim 9 in which the actuator of the pressure-responsive valve actuates at a first pressure and deactuates at a second pressure, and in which the actuator of the block valves actuates at a third pressure and deactuates at a fourth pressure, the first and third pressures being approximately equal, the second and fourth pressures being less than the first and third pressures, and the fourth pressure being less than the second pressure.

11. A control according to claim 10 in which the sizes of the orifices are selected so that when a respective conduit which is charged with fluid is opened by the second-axis trip device, the pressure on the actuator of the respective block valve is maintained at a value above the fourth pressure by virtue of the previous actuation of the block valve, which actuation interconnected the first and second ports of the block valve, the pressure not dropping below the fourth pressure until the respective conduit is vented by its selector valve means.

References Cited in the file of this patent

UNITED STATES PATENTS

| | | |
|---|---|---|
| 1,817,552 | Galloway | Aug. 4, 1931 |
| 2,589,204 | Parsons | Mar. 11, 1952 |